US011131860B1

(12) United States Patent
Mitchell

(10) Patent No.: US 11,131,860 B1
(45) Date of Patent: Sep. 28, 2021

(54) WIDE SPATIAL FIELD OPTICAL SYSTEMS

(71) Applicant: Wavefront Research, Inc., Northampton, PA (US)

(72) Inventor: Thomas A. Mitchell, Nazareth, PA (US)

(73) Assignee: Wavefront Research, Inc., Northhampton, PA (US)

( * ) Notice: Subject to any disclaimer, the term of this patent is extended or adjusted under 35 U.S.C. 154(b) by 0 days.

(21) Appl. No.: 15/259,740

(22) Filed: Sep. 8, 2016

Related U.S. Application Data

(60) Provisional application No. 62/218,013, filed on Sep. 14, 2015.

(51) Int. Cl.
| | | |
|---|---|---|
| *G01J 3/04* | (2006.01) | |
| *G02B 27/10* | (2006.01) | |
| *G02B 27/12* | (2006.01) | |
| *G01J 3/28* | (2006.01) | |
| *G01J 3/14* | (2006.01) | |
| *G01J 3/12* | (2006.01) | |

(52) U.S. Cl.
CPC ............ *G02B 27/1013* (2013.01); *G01J 3/14* (2013.01); *G01J 3/2823* (2013.01); *G02B 27/126* (2013.01); *G01J 2003/1208* (2013.01)

(58) Field of Classification Search
CPC ............ G02B 23/2415; G02B 27/1013; G02B 27/126; G01J 3/02; G01J 3/10; G01J 3/14; G01J 3/2823; G01J 2003/1208

USPC ........ 359/375, 404, 367, 368; 356/310, 328, 356/326
See application file for complete search history.

(56) References Cited

U.S. PATENT DOCUMENTS

| | | | | |
|---|---|---|---|---|
| 4,518,231 A | * | 5/1985 | Muchel | G02B 21/22 359/377 |
| 6,922,505 B1 | * | 7/2005 | Sisney | G02B 6/29307 385/37 |
| 7,505,130 B2 | * | 3/2009 | Brady | G01J 3/02 356/310 |
| 7,894,058 B2 | * | 2/2011 | Wilson | G01J 3/02 356/328 |
| 9,042,414 B2 | * | 5/2015 | Vukovic-Cvijin | G01J 3/10 250/338.5 |
| 2002/0122246 A1 | * | 9/2002 | Tearney | G01J 3/0291 359/368 |
| 2006/0274391 A1 | * | 12/2006 | Dickson | G02B 5/1814 359/1 |
| 2014/0177043 A1 | * | 6/2014 | Togino | A61B 1/00193 359/367 |

* cited by examiner

*Primary Examiner* — Audrey Y Chang
(74) *Attorney, Agent, or Firm* — Culhane Meadows PLLC; Orlando Lopez

(57) ABSTRACT

Imagers and imaging spectrometers, which are more compact in physical size with wider spatial fields than previous designs and include axis bending elements, are disclosed.

18 Claims, 26 Drawing Sheets

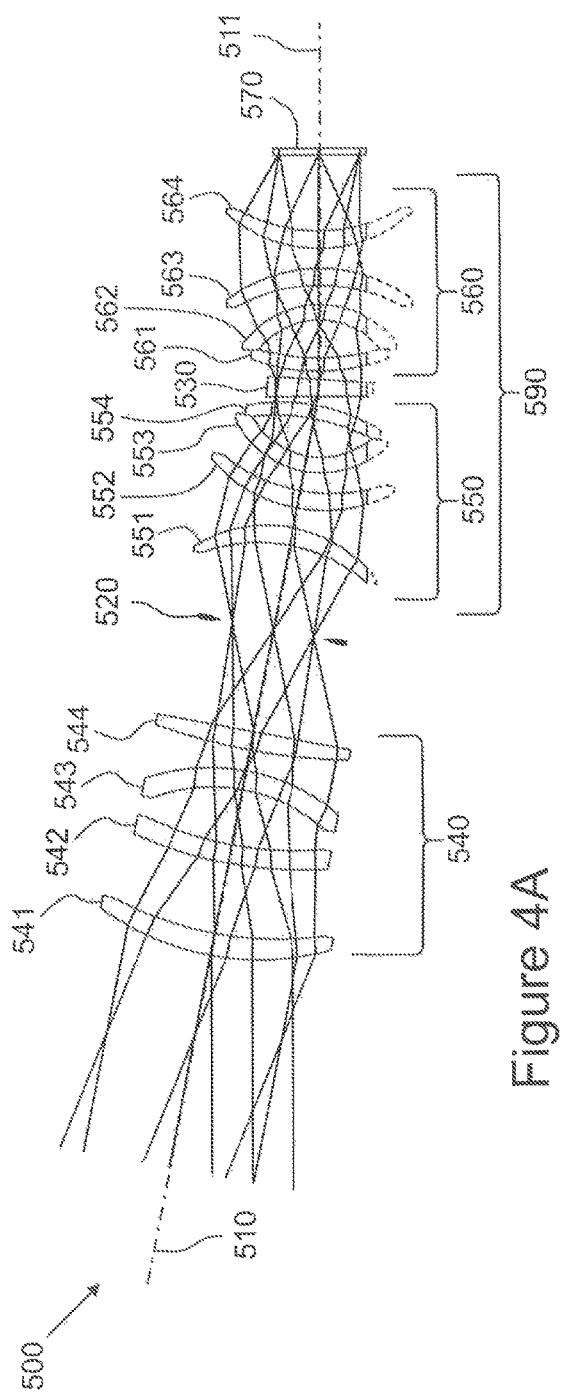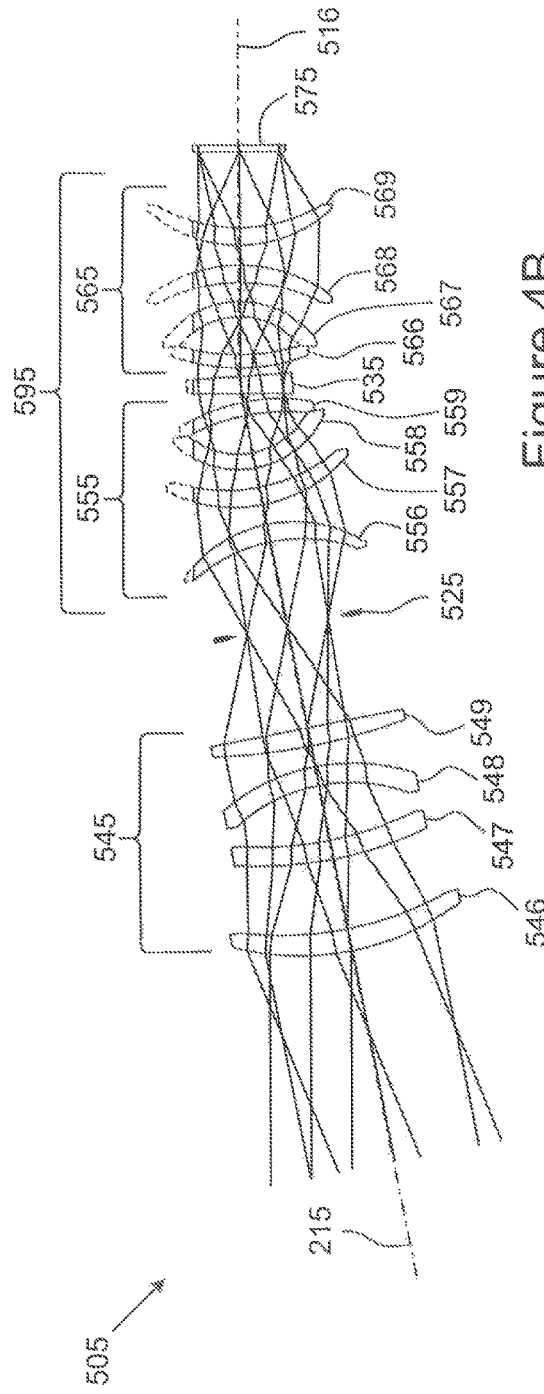

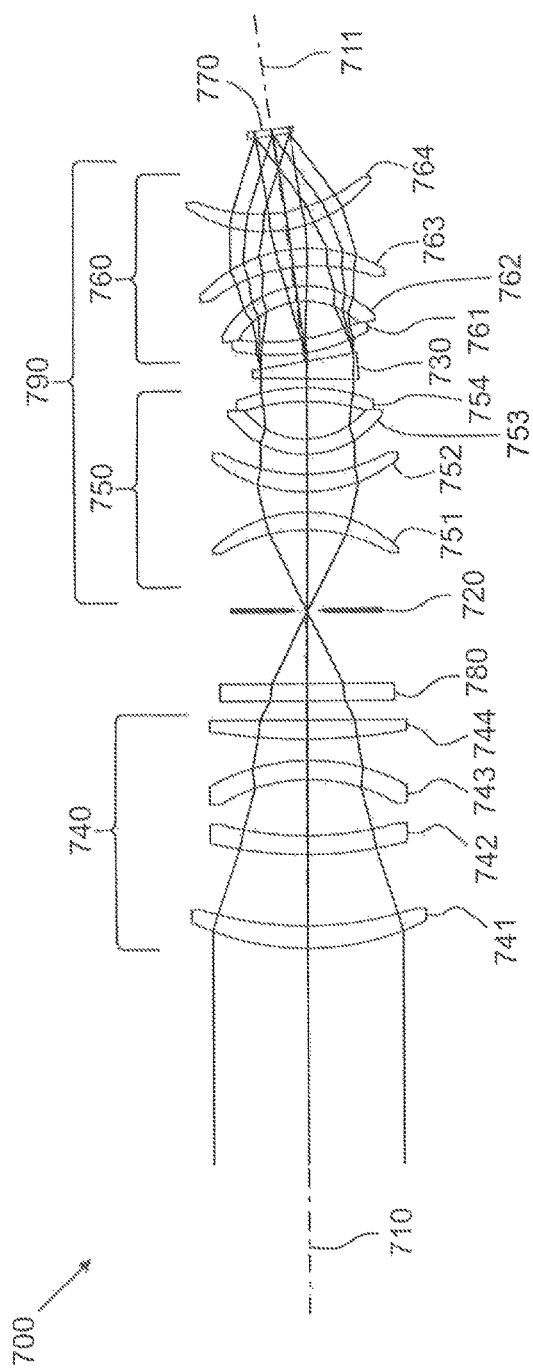
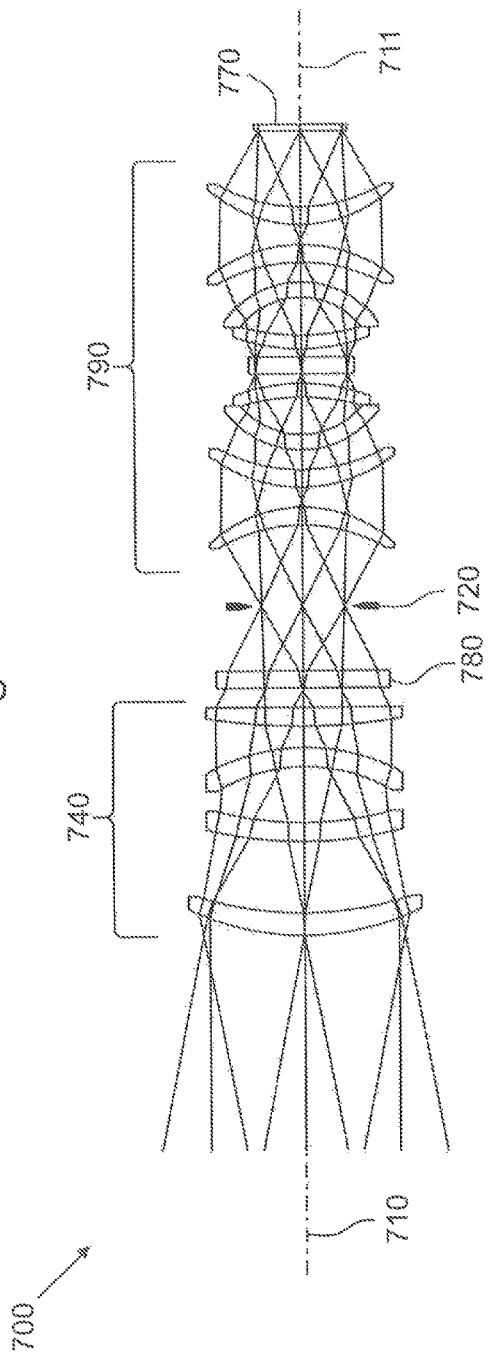
Figure 5A
Figure 5B

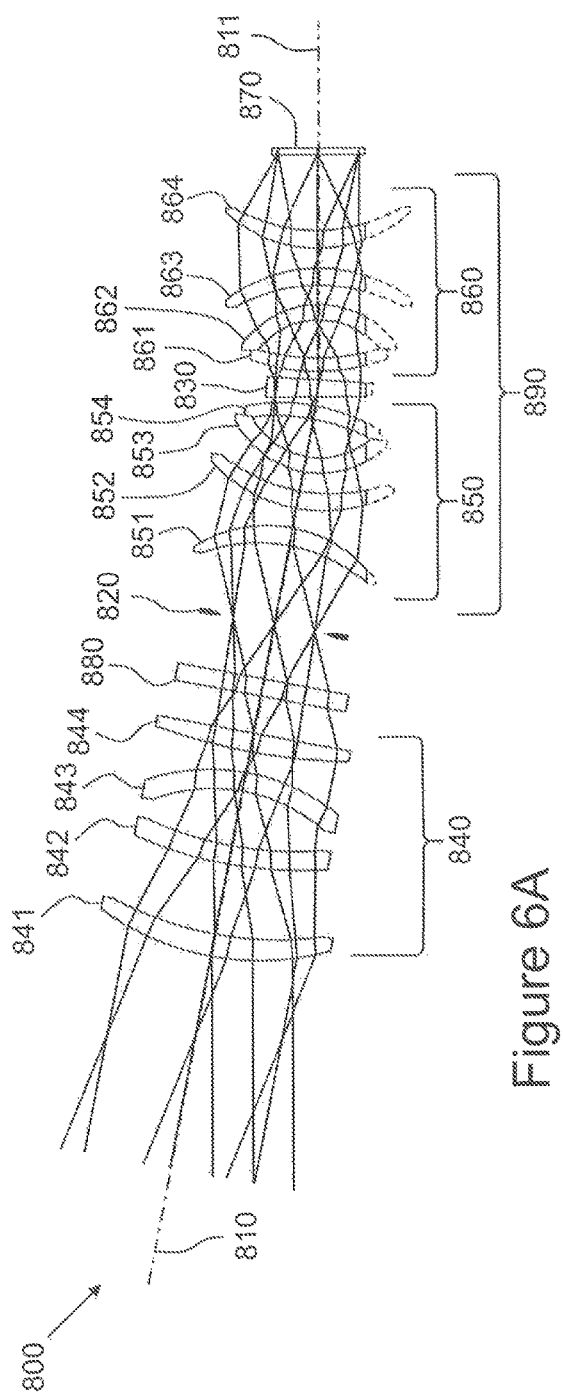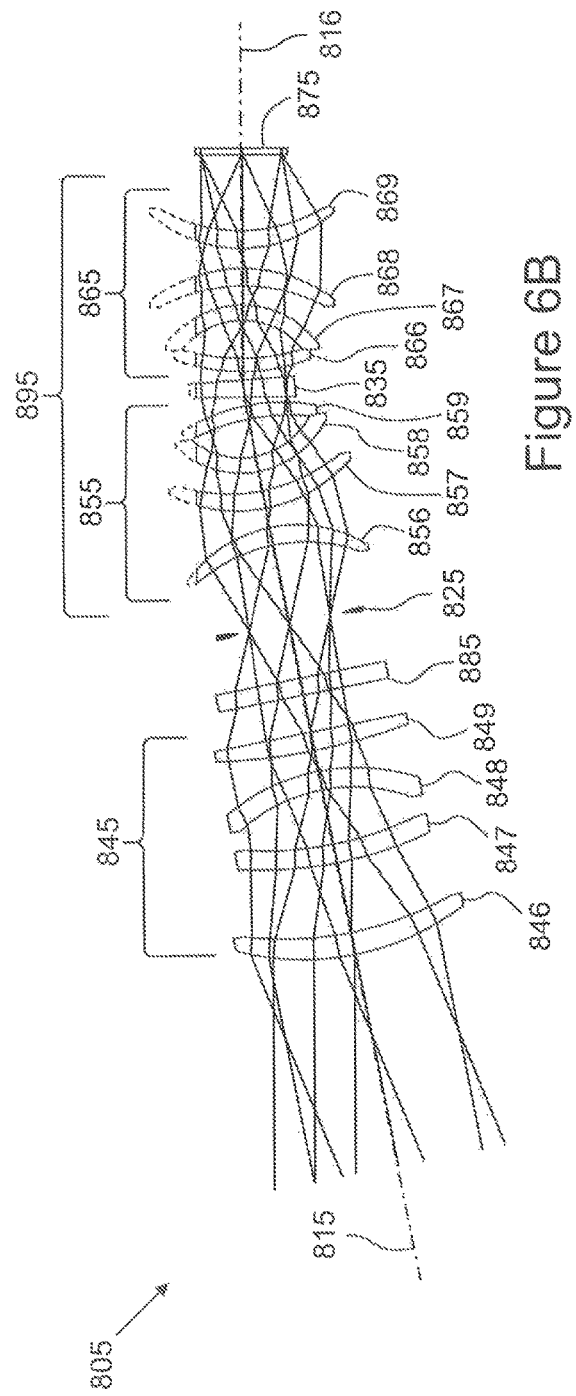
Figure 6A
Figure 6B

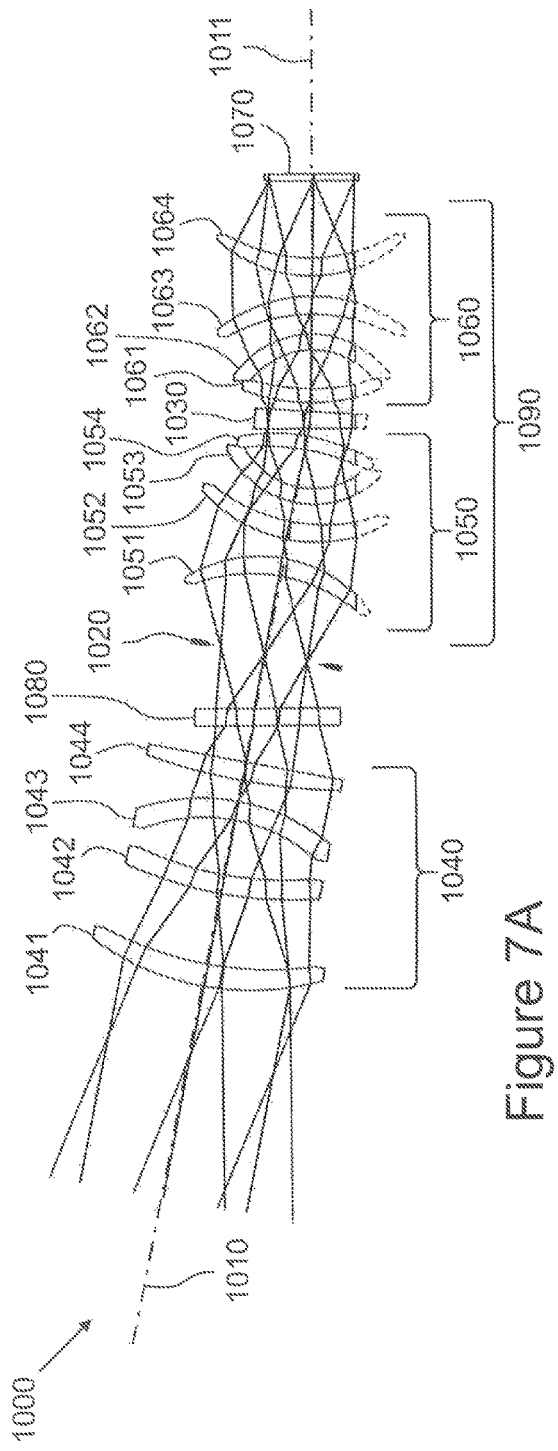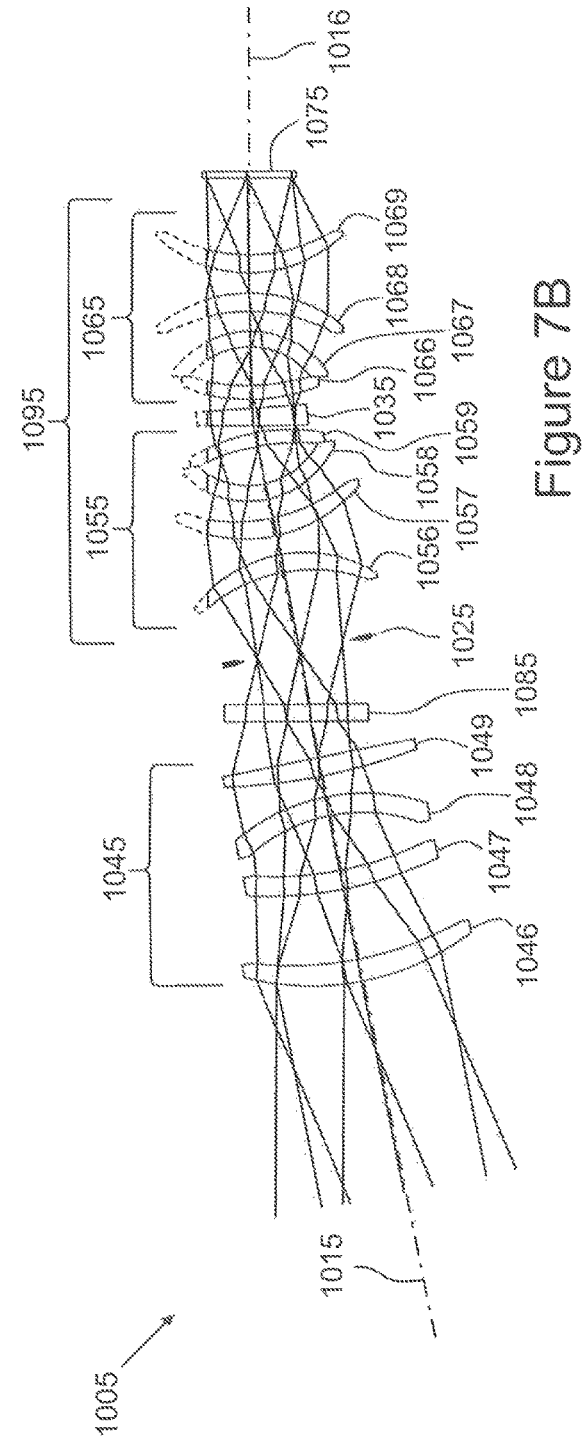
Figure 7A
Figure 7B

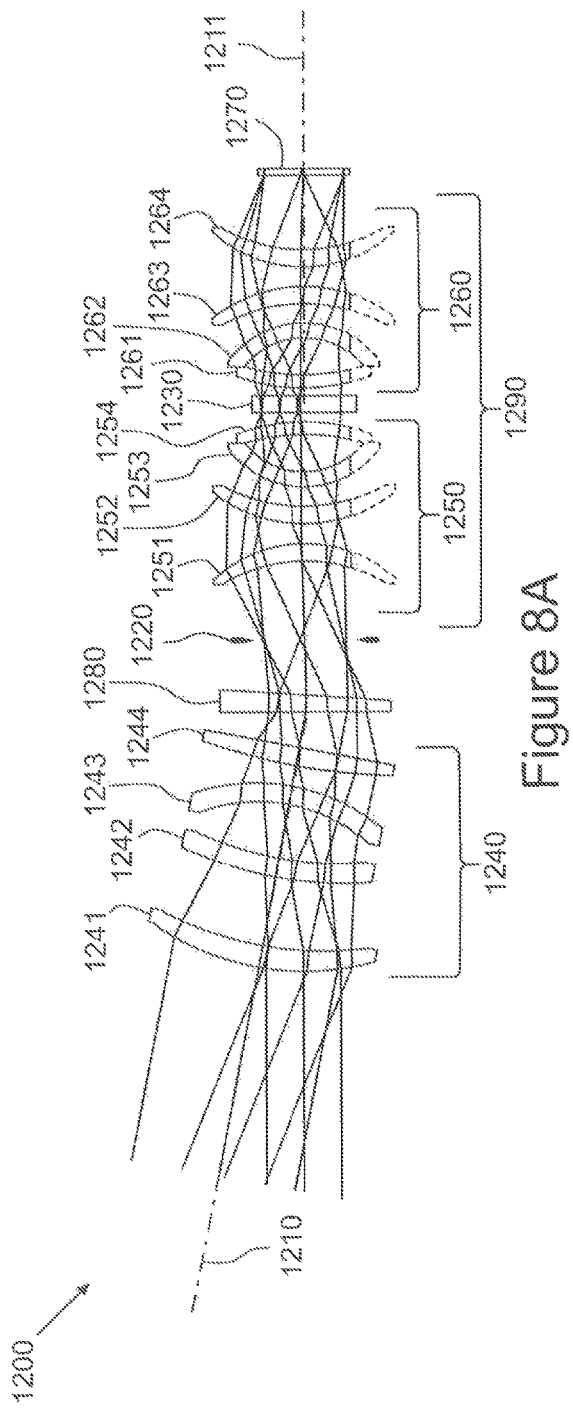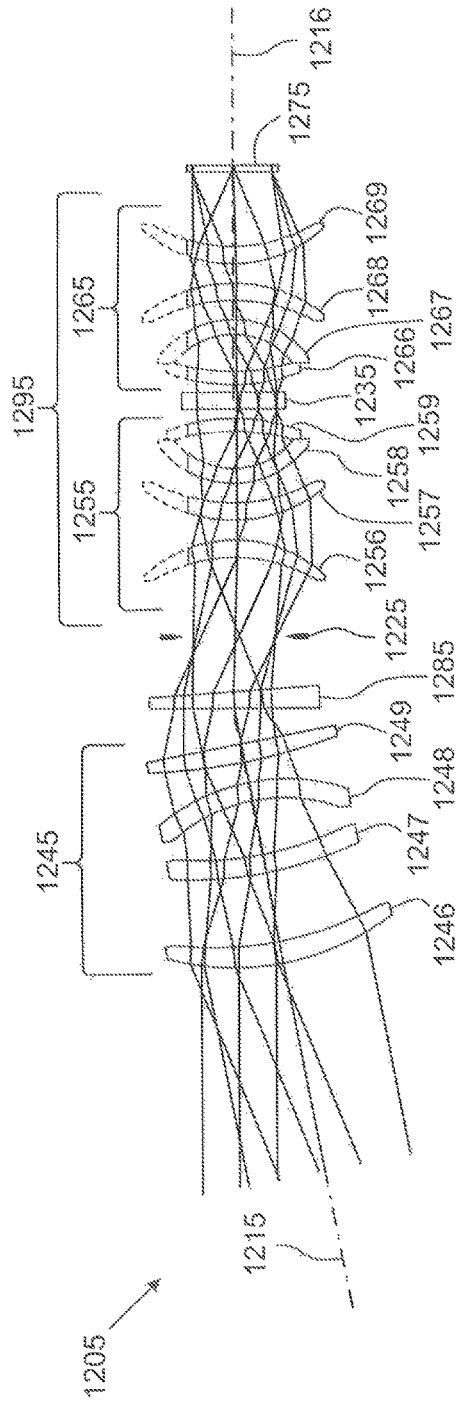
Figure 8A
Figure 8B

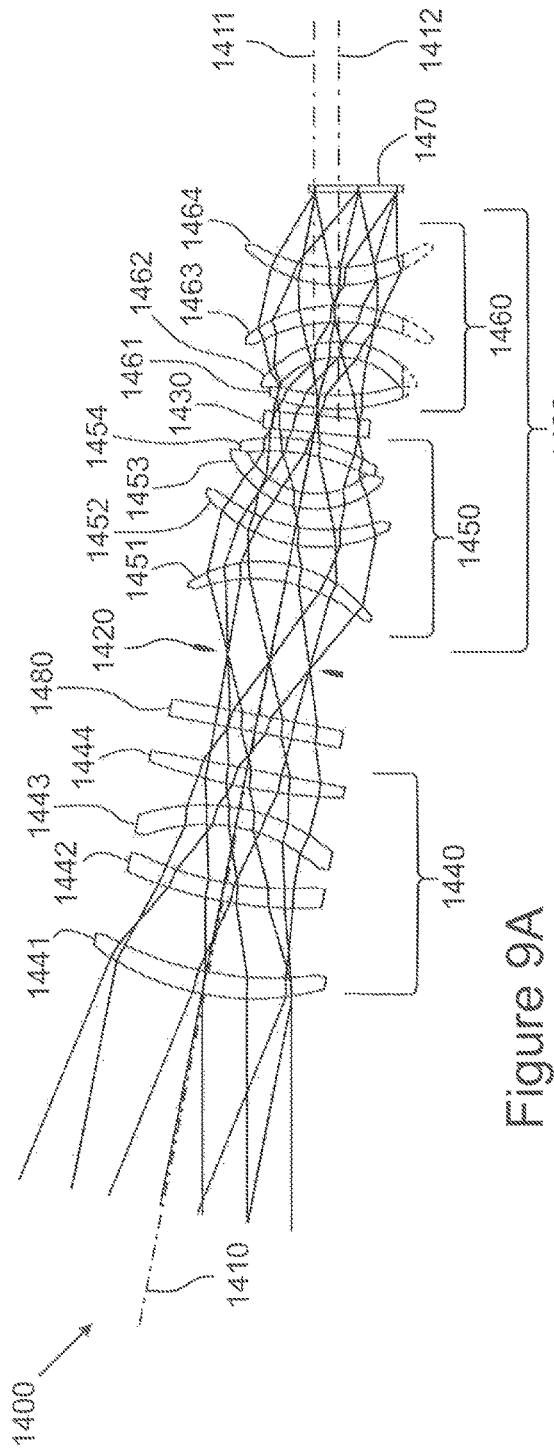
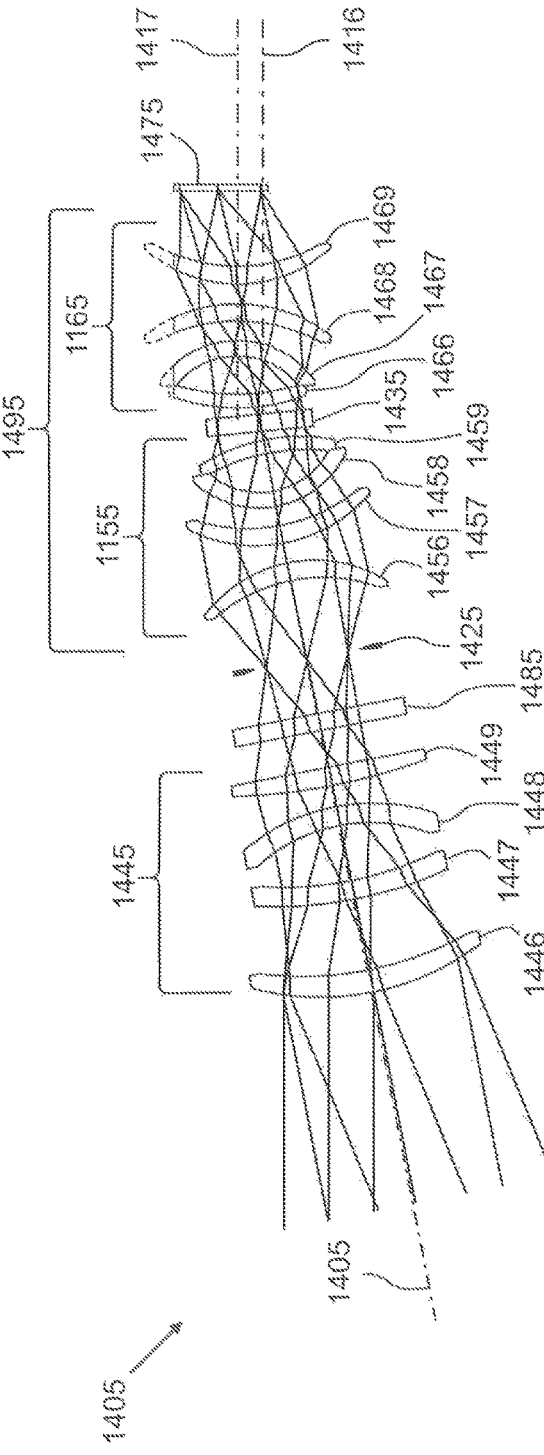
Figure 9A
Figure 9B

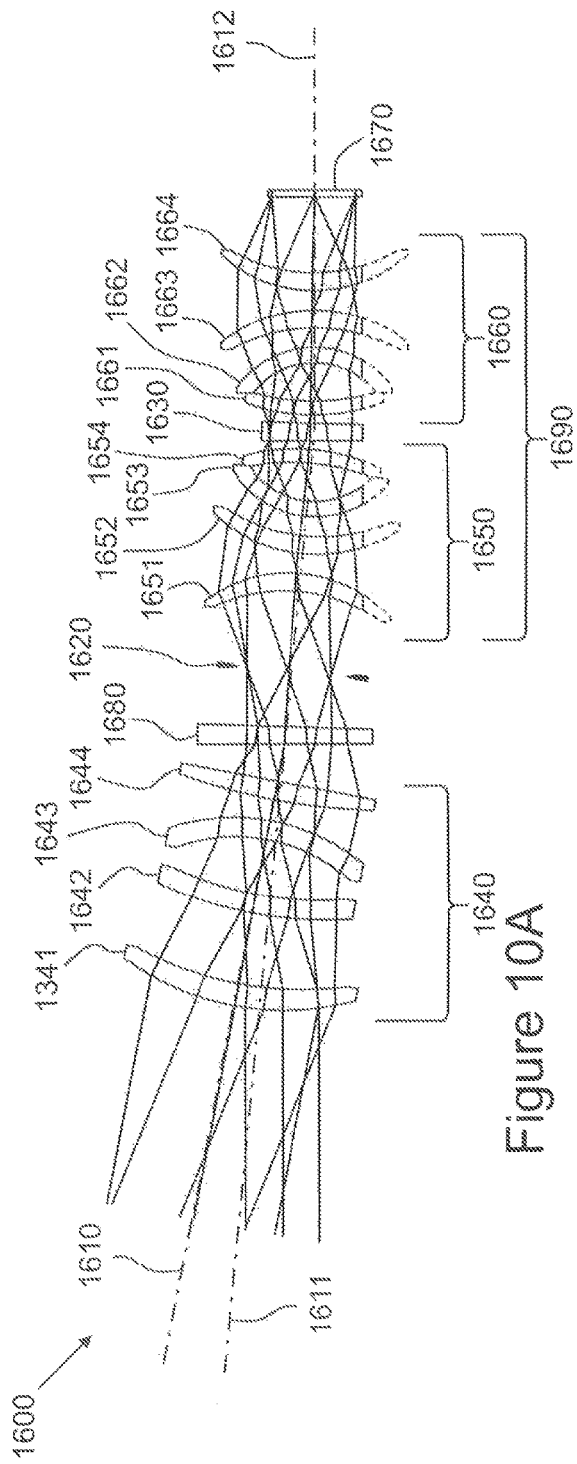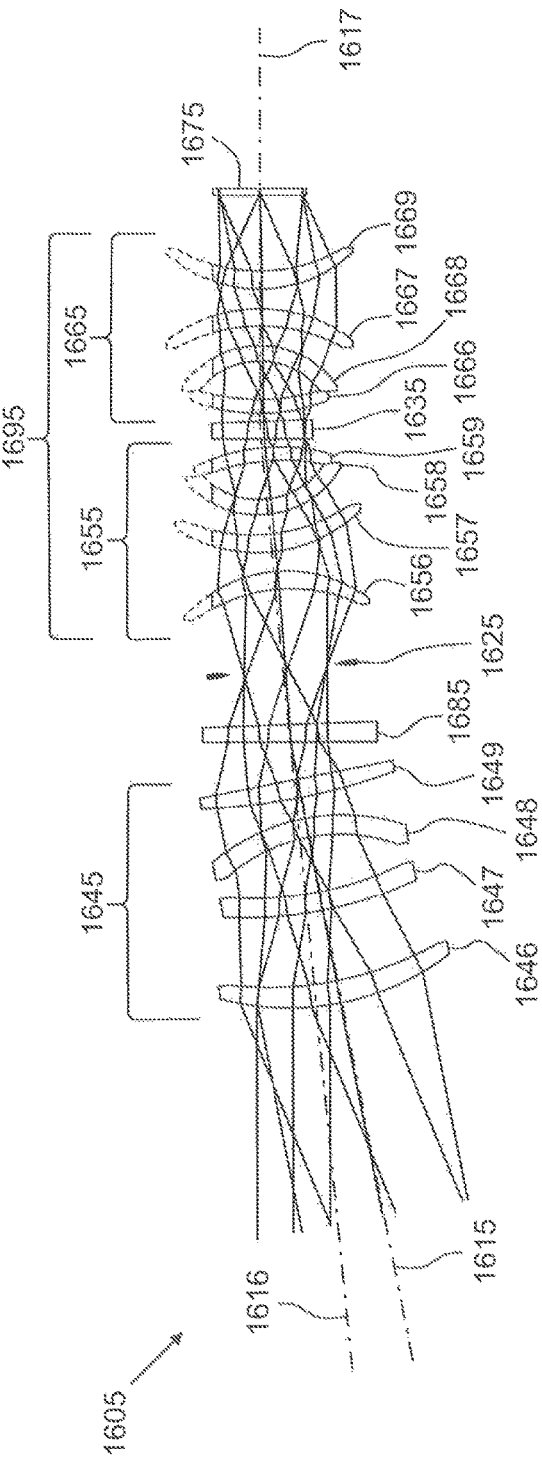

WIDE SPATIAL FIELD OPTICAL SYSTEMS

CROSS-REFERENCE TO RELATED APPLICATIONS

This application claims the benefit of and priority to U.S. Provisional Application No. 62/218,013, entitled WIDE SPATIAL FIELD OPTICAL SYSTEMS, filed on Sep. 14, 2015, the entire contents of which are incorporated herein by reference for all purposes.

STATEMENT OF GOVERNMENT INTEREST

This invention was made with U.S. Government support from the U.S. Army under contract W909MY-12-D-008/0012, subcontract WRI-002 (PO 15666). The U.S. Government has certain rights in the invention.

BACKGROUND

These teachings relate to field imager and hyperspectral imagers.

Current imager and imaging spectrometer designs are either too large in size for many applications, including but not limited to, mobile ground-based platforms, unmanned aircraft, and man-portable systems, or they do not provide enough spatial field to meet the required system performance, or they do not provide enough throughput or optical speed, or they cannot provide a combination of these characteristics simultaneously.

For example, consider some applications of hyperspectral imaging in which it is desirable to have a spectrometer that simultaneously possesses a large spatial field so that a large ground area can be covered with a single fly-over, a fast optical speed, and a very small size and mass so that the system can be transported in an unmanned aerial vehicles (UAV) or be man-portable.

The overall size of an imager or imaging spectrometer system is very dependent on not only its optical speed, but also on the overall size of its spatial field. For systems that require both of these performance features, the system can often become exceeding large, particularly for systems intended for compact platforms. There is a need for wide field imagers and hyperspectral imagers that are more compact in physical size.

SUMMARY

The embodiments of the present teachings provide wide field imagers and hyperspectral imagers that are more compact in physical size.

More specifically, some embodiments disclose and describe an imaging optical system made up of a first optical sub-system optically disposed to receive electromagnetic radiation from a first portion of a source (the first portion of the source is also referred to as a "first spatial field" and the two terms are used interchangeable in practice); the first optical sub-system being configured to substantially focus the electromagnetic radiation; a first axis bending element optically disposed to receive electromagnetic radiation from the first optical sub-system; the first axis bending element being substantially capable of redirecting the focused electromagnetic radiation from the first optical sub-system onto a first portion of an image plane; a second optical sub-system optically disposed to receive electromagnetic radiation from a second portion of the source; the second optical sub-system being configured to substantially focus the electromagnetic radiation; a second axis bending element optically disposed to receive electromagnetic radiation from the second optical sub-system; the second axis bending element being configured to substantially redirect the electromagnetic radiation from the second optical sub-system onto a second portion of the image plane. Further, the embodiments also disclose and describe a method for detecting electromagnetic radiation, the method including the steps of: focusing electromagnetic radiation received from a first portion of a source; redirecting focused light from the first portion of the source to a first portion of an image plane; substantially focusing other electromagnetic radiation received from a second portion of the source; redirecting the focused light from the second portion of the source to a second portion of an image plane; and, detecting the electromagnetic radiation. For a better understanding of the present teachings, together with other and further objects thereof, reference is made to the accompanying drawings and detailed description.

BRIEF DESCRIPTION OF THE DRAWINGS

FIG. 4A is a schematic view of an embodiment of the present teachings, taken along a plane containing its optical axes;

FIG. 4B is a schematic view of another embodiment of the present teachings, taken along a plane containing its optical axes;

FIG. 5A is a schematic view of a hyperspectral imager, taken along its optical axis in the plane parallel to the direction of dispersion;

FIG. 5B is a schematic view of the hyperspectral imager illustrated in FIG. 5A, taken along its optical axis in the plane perpendicular to the direction of dispersion;

FIG. 6A is a schematic view of an embodiment of the present teachings, taken along its optical axis in the plane perpendicular to the direction of dispersion;

FIG. 6B is a schematic view of another embodiment of the present teachings, taken along its optical axis in the plane perpendicular to the direction of dispersion;

FIG. 7A is a schematic view of an embodiment of the present teachings, taken along its optical axis in the plane perpendicular to the direction of dispersion;

FIG. 7B is a schematic view of another embodiment of the present teachings, taken along its optical axis in the plane perpendicular to the direction of dispersion;

FIG. 8A is a schematic view of an embodiment of the present teachings, taken along its optical axis in the plane perpendicular to the direction of dispersion;

FIG. 8B is a schematic view of another embodiment of the present teachings, taken along its optical axis in the plane perpendicular to the direction of dispersion;

FIG. 9A is a schematic view of an embodiment of the present teachings, taken along its optical axis in the plane perpendicular to the direction of dispersion;

FIG. 9B is a schematic view of another embodiment of the present teachings, taken along its optical axis in the plane perpendicular to the direction of dispersion;

FIG. 10A is a schematic view of an embodiment of the present teachings, taken along its optical axis in the plane perpendicular to the direction of dispersion;

FIG. 10B is a schematic view of another embodiment of the present teachings, taken along its optical axis in the plane perpendicular to the direction of dispersion;

DETAILED DESCRIPTION

These teachings relate to imagers and imaging spectrometers, which are more compact in physical size with wider spatial fields than previous designs.

Current imager and imaging spectrometer designs are either too large in size for many applications, including but not limited to, mobile ground-based platforms, unmanned aircraft, and man-portable systems, or they do not provide enough spatial field to meet the required system performance, or they do not provide enough throughput or optical speed, or they cannot provide a combination of these characteristics simultaneously.

For example, consider some applications of hyperspectral imaging in which it is desirable to have a spectrometer that simultaneously possesses a large spatial field so that a large ground area can be covered with a single fly-over, a fast optical speed, and a very small size and mass so that the system can be transported in an unmanned aerial vehicles (UAV) or be man-portable.

The overall size of an imager or imaging spectrometer system is very dependent on not only its optical speed, but also on the overall size of its spatial field. For systems that require both of these performance features, the system can often become exceeding large, particularly for systems intended for compact platforms. By dividing the spatial field up into multiple, and potentially tiled, spatial fields, separate smaller, more compact, imager or imaging spectrometer systems can be individually used to image the divided spatial fields onto separate portions of the same detecting element. In addition, portions of the same spatial field can be imaged through more than one optical system to balance out the overall throughput of the combined system. As a result, the overall system is more compact than alternative designs without sacrificing the desired spatial field or optical speed.

In some cases, other components such as optical windows, optical elements, axis bending elements, gratings, and grisms can be shared between optical systems to reduce alignment requirements between the optical systems, simplify manufacturing of optical components, provide more seamless overlap between the divided spatial fields, or any combination of these benefits.

In other cases it may be desirable to take advantage of the multiple smaller optical windows of a tiled optical system to allow for reduced window thicknesses, which in some spectral bands can provide reduced absorption losses.

Figure 1:
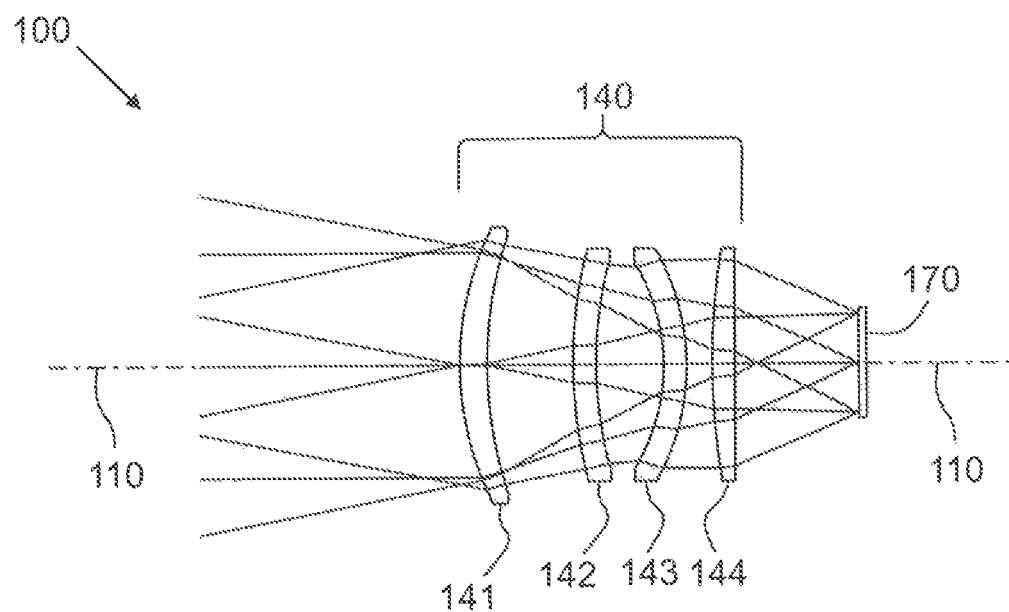
FIG. 1 is a schematic view of an imaging optical system, taken along its optical axis.

Reference is made to FIG. 1, which is a schematic view of an optical imaging system 100 taken along its optical axis 110. In operation, electromagnetic radiation, typically in the ultraviolet, visible, and/or infrared bands, hereinafter referred to generally as light, emitted or reflected by a given object, either real or virtual, hereinafter referred to generally as the source (not shown), is incident onto an optical system 140, in this embodiment made up of, but not limited to, four refractive elements 141, 142, 143, and 144, which is capable of substantially receiving a portion of the light from the source. The light is then substantially focused onto a focus position (hereinafter also referred to as an image plane, which is typically planar, but without loss of generality may also be a curved or other non-planar surface) of a CCD array, CMOS imager, phosphorescent screen, photographic film, microbolometer array, or other means of detecting light energy, hereinafter referred to generally as a detecting element 170.

Figure 2A:
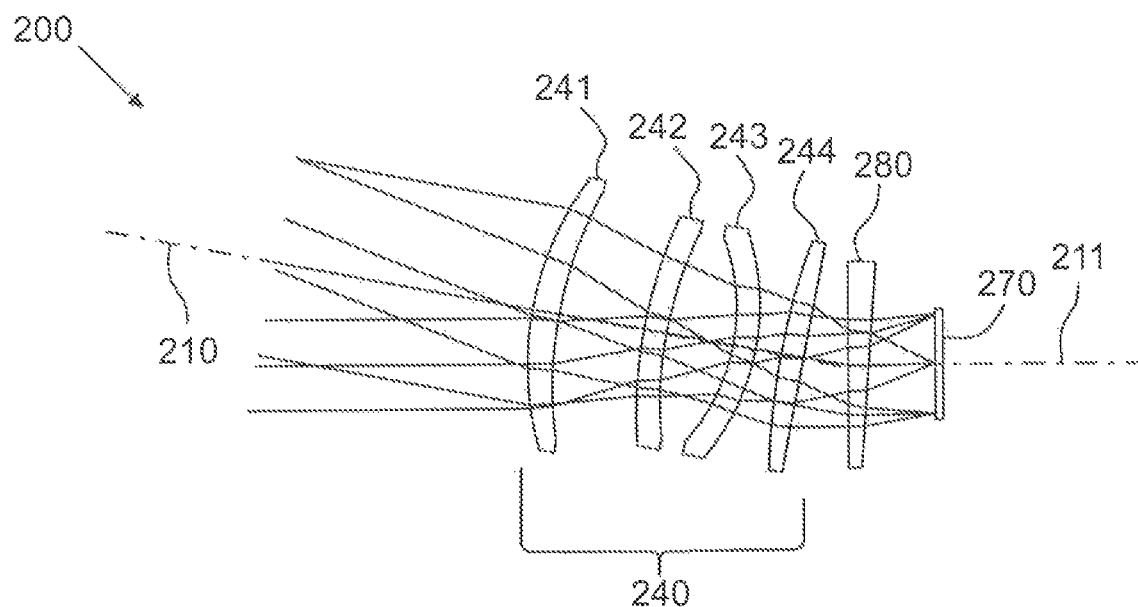
FIG. 2A is a schematic view of an embodiment of the present teachings, taken along a plane containing its optical axes.

Reference is made to FIG. 2A, which is a schematic view of an embodiment of the present teachings 200 taken along the plane containing its optical axes 210 and 211. In operation, light, emitted or reflected by a portion of the source (not shown), is incident onto an optical system 240, in this embodiment made up of, but not limited to, four refractive elements 241, 242, 243, and 244, which is capable of substantially receiving a portion of the light from the source and focusing the light. The light is then incident onto an axis bending element 280, in this embodiment made up of a prism but in general is any component capable of bending, or equivalently redirecting, an optical axis, such as, but not limited to, a mirror, a grating, a grism, an achromatized prism, or other method of redirecting light, hereinafter referred to generally as an axis bending element, which is capable of substantially bending the optical axis 210 onto the optical axis 211. In this embodiment, the axis bending element 280 is further capable of receiving a portion of the light from the optical system 240 and substantially redirecting the focusing light onto a detecting element 270.

The axis bending element used in these teachings should be distinguished from field flatteners such as the Gradient Rod Array Field Flattener (GRAFF) disclosed in U.S. Pat. Nos. 7,428,106 and 7,359,123. GRAFFs operate using finite conjugates to relay one spatial field to another, much like an optical relay system, but where the curvatures of the object and image planes can be arbitrary. This type of system could not work with infinite conjugates because each element of the GRAFF would inherently have such a substantial amount of overlap in its field of view, that they would have substantially the same field of view (FOV), producing multiple copies of the same spatial field rather than an extended wider spatial field. To accomplish wide spatial field imaging, each imaging component must image a substantially separate field of view.

It should also be noted that the axis bending element is to be distinguished from a dispersing element in that the intent of the axis bending element described in these teachings redirects a spatial field of view as opposed to a dispersing element, which has the primary function of angularly spreading light according to its wavelength.

Figure 2B:
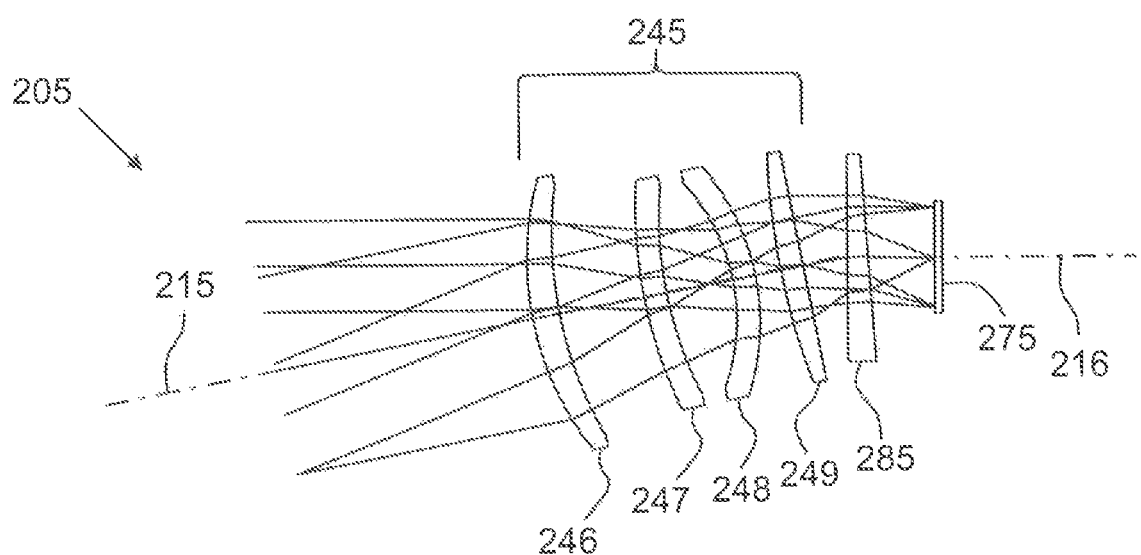
FIG. 2B is a schematic view of another embodiment of the present teachings, taken along a plane containing its optical axes.

Reference is made to FIG. 2B, which is a schematic view of another embodiment of the present teachings 205 taken along the plane containing its optical axes 215 and 216. In operation, light, emitted or reflected by a portion of the source (not shown), is incident onto an optical system 245, in this embodiment made up of, but not limited to, four refractive elements 246, 247, 248, and 249, which is capable of substantially receiving a portion of the light from the source and focusing the light. The light is then incident onto an axis bending element 285, which is capable of substantially bending the optical axis 215 onto the optical axis 216. In this embodiment, the axis bending element 285 is further capable of receiving a portion of the light from the optical system 245 and substantially redirecting the focusing light onto a detecting element 275.

Figure 2C:
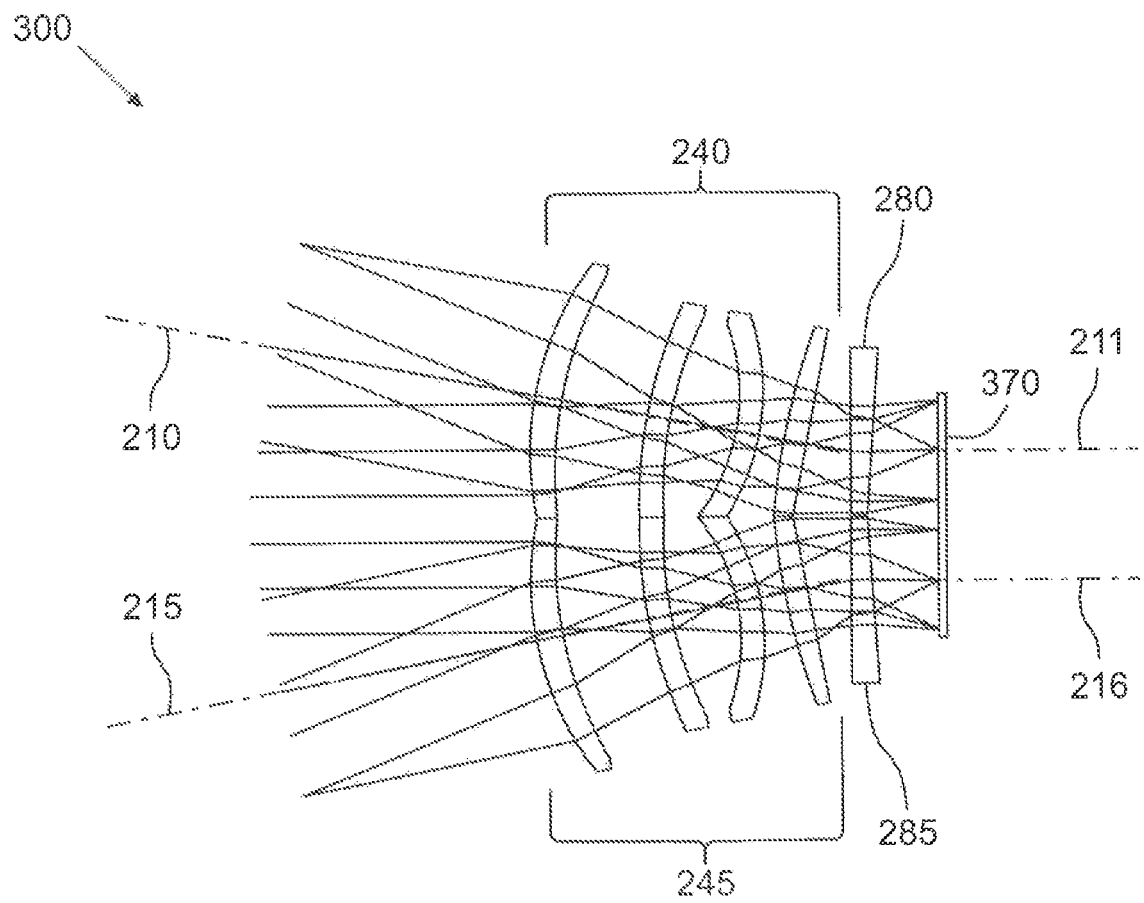
FIG. 2C is a schematic view of an embodiment of the present teachings, consisting of portions of the embodiments illustrated in FIGS. 2A and 2B, taken along a plane containing its optical axes.

Reference is made to FIG. 2C, which is a schematic view of an embodiment of the present teachings 300 taken along the plane containing its optical axes 210 and 215. In operation, light, emitted or reflected by a first portion of the source (not shown), is incident onto a first optical system 240, which is capable of substantially receiving a portion of the light from the first portion of the source and focusing the light. The light is then incident onto a first axis bending element 280, which is capable of substantially bending the optical axis 210 onto the optical axis 211. In this embodiment, the axis bending element 280 is further capable of receiving a portion of the light from the first optical system 240 and substantially redirecting the focusing light onto a portion of a detecting element 370. Light, emitted or reflected by a second portion of the source (not shown), is incident onto a second optical system 245, which is capable of substantially receiving a portion of the light from the second portion of the source and focusing the light. The light is then incident onto a second axis bending element 285, which is capable of substantially bending the optical axis 215 onto the optical axis 216. In this embodiment, the axis bending element 285 is further capable of receiving a portion of the light from the second optical system 245 and substantially redirecting the focusing light onto a second portion of the detecting element 370. In this embodiment, the optical axes 211 and 216 are substantially displaced and parallel to one another, although in other embodiments these axes may not be displaced, and in other embodiments they may not be parallel.

Figure 3:
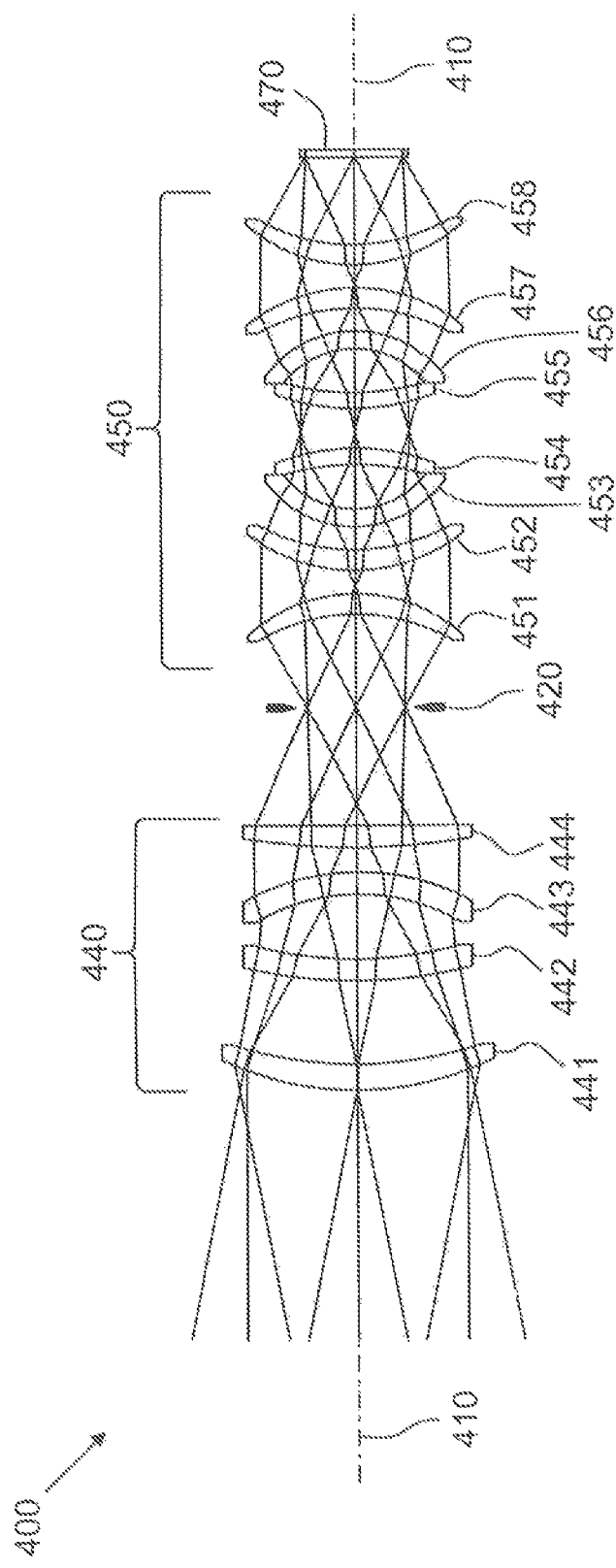
FIG. 3 is a schematic view of an imaging optical relay system, taken along its optical axis.

Reference is made to FIG. 3, which is a schematic view of an imaging optical relay system 400 taken along its optical axis 410. In operation, light, emitted or reflected by a source (not shown), is incident onto an optical system 440, in this embodiment made up of, but not limited to, four refractive elements 441, 442, 443, and 444, which is capable of substantially receiving a portion of the light from the source. The light is then substantially focused onto a field aperture 420, in this embodiment consisting of a field mask, but in generally is any method of limiting the spatial field of view, such as, but not limited to, a mechanical opening in an otherwise opaque substrate, an etched opening in an otherwise opaque coating, or other method of extracting a spatial field, hereinafter referred to generally as a field aperture, which is capable of substantially receiving the light from the imager 440. Light transmitted by the field aperture 420 is then incident onto an optical relay system 450, in this embodiment made up of, but not limited to, eight refractive elements 451, 452, 453, 454, 455, 456, 457, and 458, which is capable of substantially receiving a portion of the light from the field aperture 420 and substantially focusing the light onto a detecting element 470.

Reference is made to FIG. 4A, which is a schematic view of an embodiment of the present teachings 500 taken along the plane containing its optical axes 510 and 511. In operation, light, emitted or reflected by a portion of the source (not shown), is incident onto an optical system 540, in this embodiment made up of, but not limited to, four refractive elements 541, 542, 543, and 544, which is capable of substantially receiving a portion of the light from the source. The light is then substantially focused onto a field aperture 520, which is capable of substantially receiving the light from the optical system 540. Light transmitted by the field aperture 520 is then incident onto a first half 550 of an optical relay system 590, in this embodiment made up of, but not limited to, four refractive elements 551, 552, 553, and 554, which is capable of substantially receiving a portion of the light from the field aperture 520. The light is then incident onto an axis bending element 530, which is capable of substantially bending the optical axis 510 onto the optical axis 511. In this embodiment, the axis bending element 530 is further capable of receiving the light from the first half 550 of the optical relay system 590 and substantially redirecting the light. The redirected light is then incident onto a second half 560 of the optical relay system 590, in this embodiment made up of, but not limited to, four refractive elements 561, 562, 563, and 564, which is capable of substantially receiving a portion of the redirected light from the axis bending element 530 and substantially focusing the redirected light onto a detecting element 570.

Reference is made to FIG. 4B, which is a schematic view of another embodiment of the present teachings 505 taken along the plane containing its optical axes 515 and 516. In operation, light, emitted or reflected by a portion of the source (not shown), is incident onto an optical system 546, in this embodiment made up of, but not limited to, four refractive elements 547, 548, 549, and 540, which is capable of substantially receiving a portion of the light from the source. The light is then substantially focused onto a field aperture 525, which is capable of substantially receiving the light from the optical system 545. Light transmitted by the field aperture 525 is then incident onto a first half 555 of an optical relay system 595, in this embodiment made up of, but not limited to, four refractive elements 556, 557, 558, and 559, which is capable of substantially receiving a portion of the light from the field aperture 525. The light is then incident onto an axis bending element 535, which is capable of substantially bending the optical axis 515 onto the optical axis 516. In this embodiment, the axis bending element 535 is further capable of receiving the light from the first half 555 of the optical relay system 595 and substantially redirecting the light. The redirected light is then incident onto a second half 565 of the optical relay system 595, in this embodiment made up of, but not limited to, four refractive elements 566, 567, 568, and 569, which is capable of substantially receiving a portion of the redirected light from the axis bending element 535 and substantially focusing the redirected light onto a detecting element 575.

Figure 4C:
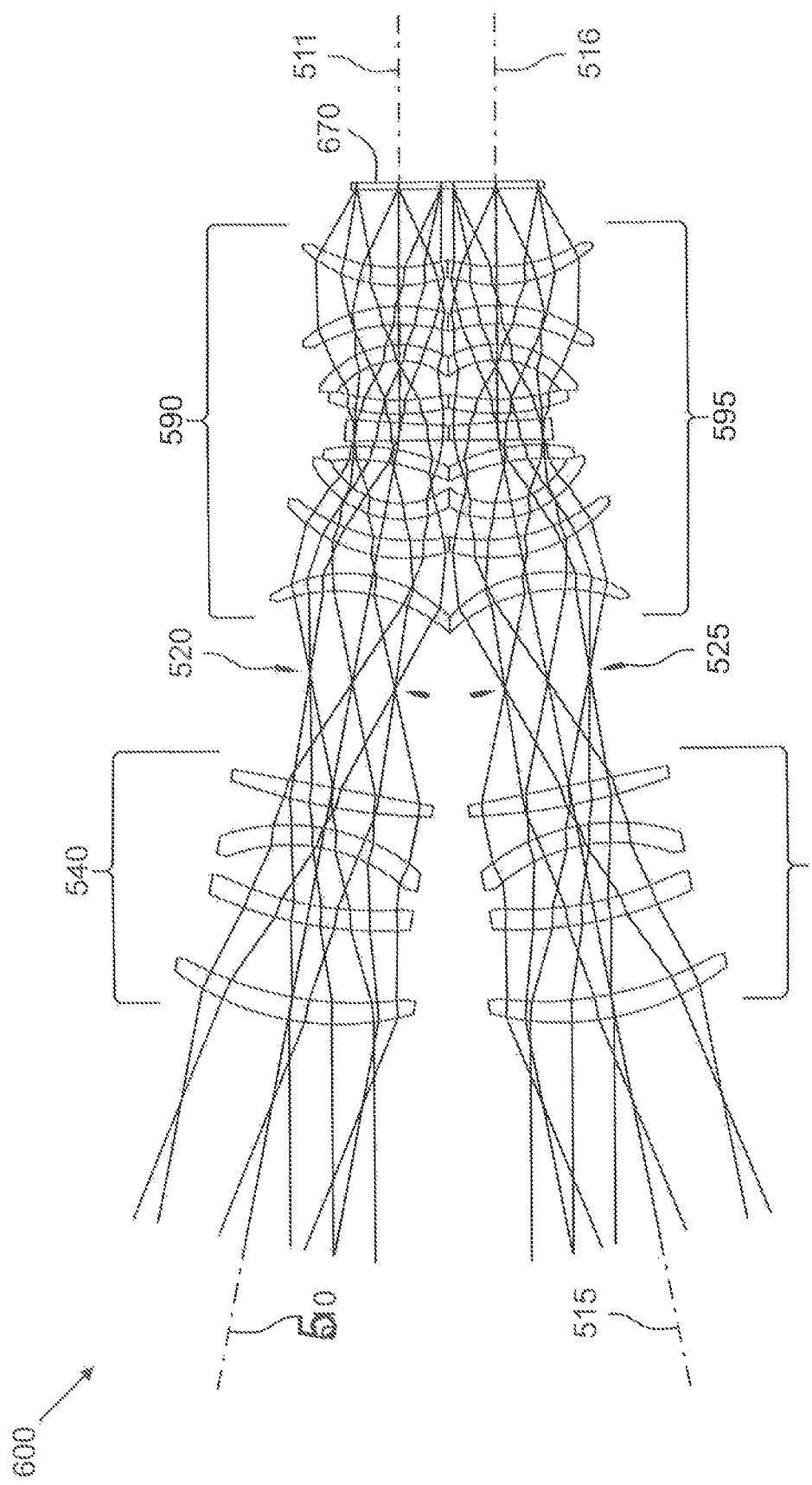
FIG. 4C is a schematic view of an embodiment of the present teachings, consisting of portions of the embodiments illustrated in FIGS. 4A and 4B, taken along a plane containing its optical axes.

Reference is made to FIG. 4C, which is a schematic view of an embodiment of the present teachings 600 taken along the plane containing its optical axes 510, 511, 515, and 516. In operation, light, emitted or reflected by a first portion of the source (not shown), is incident onto a first optical system 540, which is capable of substantially receiving a portion of the light from the first portion of the source. The light is then substantially focused onto a first field aperture 520, which is capable of substantially receiving the light from the first optical system 540. Light transmitted by the first field aperture 520 is then incident onto a first optical relay system 590, which is capable of substantially receiving a portion of the light from the first field aperture 520 and substantially redirecting and reimaging the light from the first field aperture 520 onto a first portion of a detecting element 670. Light, emitted or reflected by a second portion of the source (not shown), is incident onto a second optical system 545, which is capable of substantially receiving a portion of the light from the second portion of the source. The light is then substantially focused onto a second field aperture 525, which is capable of substantially receiving the light from the second optical system 545. Light transmitted by the second field aperture 525 is then incident onto a second optical relay system 595, which is capable of substantially receiving a portion of the light from the second field aperture 525 and substantially redirecting and reimaging the light from the second field aperture 525 onto a second portion of the detecting element 670.

Reference is made to FIG. 5A, which is a schematic view of an optical imaging spectrometer system 700, in this embodiment including a refractive relay spectrometer, of the type described in the co-pending U.S. patent application Ser. No. 14/212,327, entitled COMPACT SPECTROMETER WITH HIGH SPECTRAL RESOLUTION, filed on Mar. 14, 2014, which is incorporated herein by reference in its entirety and for all purposes and reproduced in the Appendix, but in general can be any type of spectrometer, taken along its optical axes 710 and 711, in the plane parallel to the direction of dispersion. In operation, light, emitted or reflected by a source (not shown), is incident onto an optical system 740, in this embodiment made up of, but not limited to, four refractive elements 741, 742, 743, and 744, which is capable of substantially receiving a portion of the light from the source and focusing the light. The light is then incident onto an optional optical window 780, in the form of a transmitting element but in general is any component capable of transmitting light, hereinafter referred to generally as a window, which is included in the optical path in some embodiments. The optional window 780 is capable of substantially receiving a portion of the light from the optical system 740 and substantially transmitting the focusing light onto a field aperture 720, in this embodiment a slit aperture, which is capable of substantially receiving the light from the optical system 740. Light transmitted by the field aperture 720 is then incident onto a first half 750 of an optical relay spectrometer system 790, in this embodiment made up of, but not limited to, four refractive elements 751, 752, 753, and 754, which is capable of substantially receiving a portion of the light from the field aperture 720. The light is then incident onto a dispersing element 730, in the form of, but not limited to a transmission or reflection diffraction grating, prism, or grism, but in general is any component capable of angularly separating light energy according to its wavelength, hereinafter referred to generally as a dispersing element, which is capable of substantially receiving the light from the first half 750 of the optical relay spectrometer system 790 and substantially dispersing the light. The dispersed light is then incident onto a second half 760 of the optical relay spectrometer system 790, in this embodiment made up of, but not limited to, four refractive elements 761, 762, 763, and 764, which is capable of substantially receiving a portion of the dispersed light from the dispersing element 730 and substantially focusing the dispersed light onto a detecting element 770.

The axis bending element used in these teachings should be distinguished from the light bending element described in the co-pending U.S. patent application Ser. No. 14/212,327, entitled COMPACT SPECTROMETER WITH HIGH SPECTRAL RESOLUTION, filed on Mar. 14, 2014. The light bending elements described in the compact spectrometer with high spectral resolution are used to redirect angularly dispersed light along the optical axis of an optical subsystem to allow for greater dispersion at the image plane, but introduce no substantial increase in the spatial field of view, which is typically orthogonal to the direction of dispersion. The axis bending elements described in the present teachings, however, are used to redirect a portion of a spatial field to allow for multiple fields of view to be combined into a wider combined field of view.

Reference is made to FIG. 5B, which is a schematic view of the optical imaging spectrometer system 700 illustrated in FIG. 5A, taken along its optical axis 710, in the plane perpendicular to the direction of dispersion. In operation, light, emitted or reflected by a source (not shown), is incident onto the optical system 740, which is capable of substantially receiving a portion of the light from the source and focusing the light. The light is then incident onto the optional window 780, which is capable of substantially receiving a portion of the light from the optical system 740 and substantially redirecting the focusing light onto the field aperture 720, which is capable of substantially receiving the light from the optical system 740. Light transmitted by the field aperture 720 is then incident onto the optical relay spectrometer system 790, which is capable of substantially receiving a portion of the light from the field aperture 720 and substantially dispersing and reimaging the light from the field aperture 720 onto the detecting element 770. The embodiments shown in FIGS. 6A-11D also consist of a refractive relay spectrometer, and as such, the schematic views of these embodiments, taken along the plane parallel to the direction of dispersion, have not been repeated because they are similar to that shown in FIG. 5A.

Reference is made to FIG. 6A, which is a schematic view of an embodiment of the present teachings 800 taken along the plane containing its optical axis 810, and in the plane perpendicular to the direction of dispersion. In operation, light, emitted or reflected by a portion of the source (not shown), is incident onto an optical system 840, in this embodiment made up of, but not limited to, four refractive elements 841, 842, 843, and 844, which is capable of substantially receiving a portion of the light from the source and focusing the light. The light is then incident onto an optional window 880, which is included in the optical path in some embodiments. The optional window 880 is capable of substantially receiving a portion of the light from the optical system 840 and substantially transmitting the focusing light onto a field aperture 820, which is capable of substantially receiving the light from the optical system 840. Light transmitted by the field aperture 820 is then incident onto a first half 850 of an optical relay spectrometer system 890, in this embodiment made up of, but not limited to, four refractive elements 851, 852, 853, and 854, which is capable of substantially receiving a portion of the light from the field aperture 820. The light is then incident onto a dispersing and redirecting element 830, in this embodiment consisting of a compound angle grism whose direction of dispersion is in a direction substantially different than the angle of the deviation of the prism component of the grism, but in general can consist of multiple elements, such as but not limited to a grating and a prism, where the direction of dispersion of the grating is in a direction substantially different than the angle of the deviation of the prism. The dispersing and redirecting element 830 is capable of substantially receiving the light from the first half 850 of the optical relay spectrometer system 890 and substantially dispersing the light in a first direction and redirecting the light in a second direction. The dispersed and redirected light is then incident onto a second half 860 of the optical relay spectrometer system 890, in this embodiment made up of, but not limited to, four refractive elements 861, 862, 863, and 864, which is capable of substantially receiving a portion of the dispersed and redirected light from the dispersing and redirecting element 830 and substantially focusing the dispersed and redirected light onto a detecting element 870.

Reference is made to FIG. 6B, which is a schematic view of another embodiment of the present teachings 805 taken along the plane containing its optical axis 815, and in the plane perpendicular to the direction of dispersion. In operation, light, emitted or reflected by a portion of the source (not shown), is incident onto an optical system 845, in this embodiment made up of, but not limited to, four refractive elements 846, 847, 848, and 849, which is capable of substantially receiving a portion of the light from the source and focusing the light. The light is then incident onto an optional window 885, which is included in the optical path in some embodiments. The optional window 885 is capable of substantially receiving a portion of the light from the optical system 845 and substantially transmitting the focusing light onto a field aperture 825, which is capable of substantially receiving the light from the optical system 845. Light transmitted by the field aperture 825 is then incident onto a first half 855 of an optical relay spectrometer system 895, in this embodiment made up of, but not limited to, four refractive elements 856, 857, 858, and 859, which is capable of substantially receiving a portion of the light from the field aperture 825. The light is then incident onto a dispersing and redirecting element 835, which is capable of substantially receiving the light from the first half 855 of the optical relay spectrometer system 895 and substantially dispersing the light in a first direction and redirecting the light in a second direction. The dispersed and redirected light is then incident onto a second half 865 of the optical relay spectrometer system 895, in this embodiment made up of, but not limited to, four refractive elements 866, 867, 868, and 869, which is capable of substantially receiving a portion of the dispersed and redirected light from the dispersing and redirecting element 835 and substantially focusing the dispersed and redirected light onto a detecting element 870.

Figure 6C:
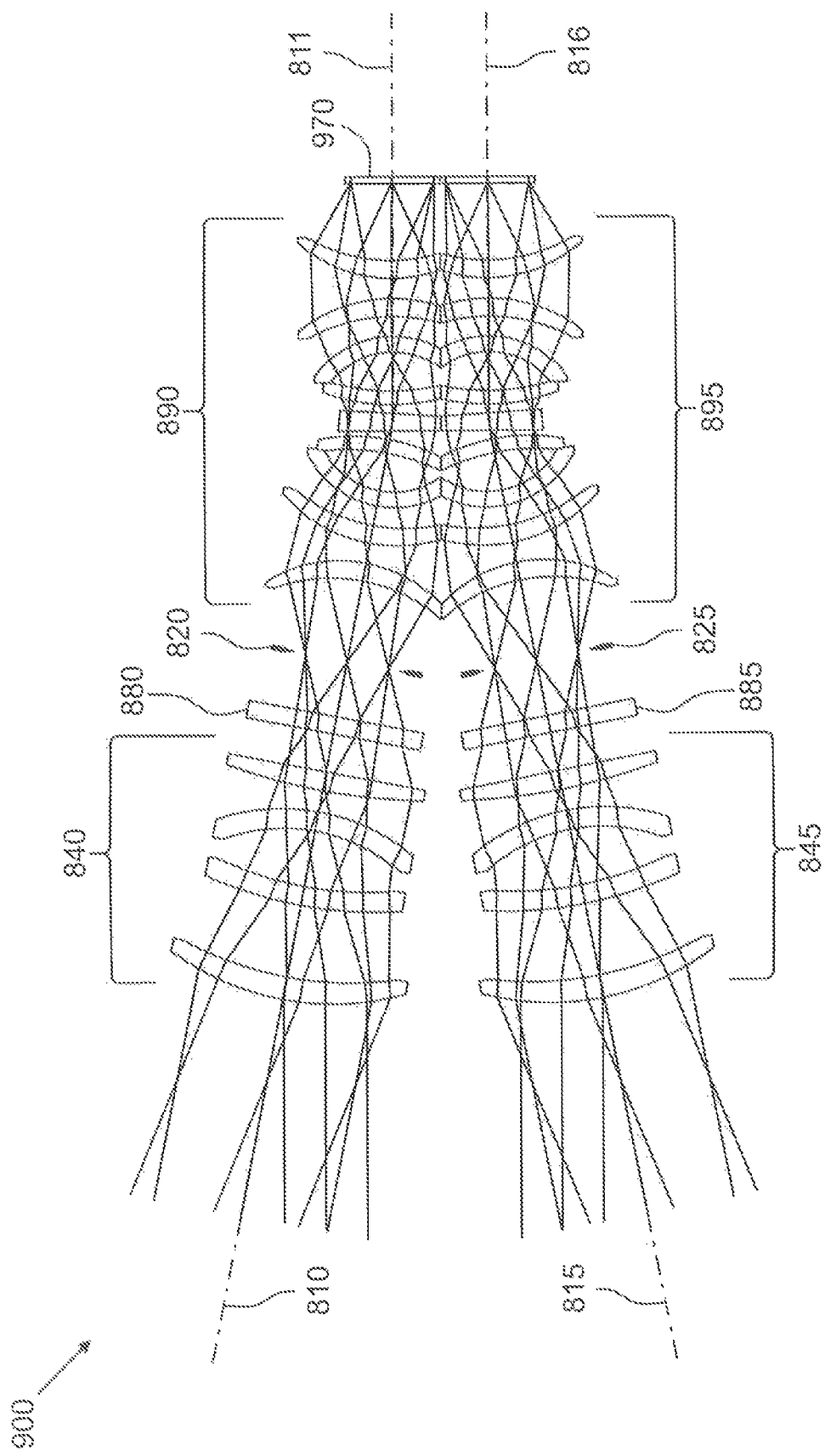
FIG. 6C is a schematic view of an embodiment of the present teachings, consisting of portions of the embodiments illustrated in FIGS. 6A and 6B, taken along the plane perpendicular to the direction of dispersion.

Reference is made to FIG. 6C, which is a schematic view of an embodiment of the present teachings 900 taken along the plane containing its optical axes 810 and 815, and in the plane perpendicular to the direction of dispersion. In operation, light, emitted or reflected by a first portion of the source (not shown), is incident onto a first optical system 840, which is capable of substantially receiving a portion of the light from the first portion of the source and focusing the light. The light is then incident onto a first optional window 880, which is included in the optical path in some embodiments. The first optional window 880 is capable of substantially receiving a portion of the light from the first optical system 840 and substantially transmitting the focusing light onto a first field aperture 820, which is capable of substantially receiving the light from the first optical system 840. Light transmitted by the first field aperture 820 is then incident onto a first optical relay spectrometer system 890, which is capable of substantially receiving a portion of the light from the first field aperture 820 and substantially dispersing, redirecting, and reimaging the light from the first field aperture 820 onto a first portion of a detecting element 970. Light, emitted or reflected by a second portion of the source (not shown), is incident onto a second optical system 845, which is capable of substantially receiving a portion of the light from the second portion of the source and focusing the light. The light is then incident onto a second optional window 885, which is included in the optical path in some embodiments. The second optional window 885 is capable of substantially receiving a portion of the light from the second optical system 845 and substantially transmitting the focusing light onto a second field aperture 825, which is capable of substantially receiving the light from the second optical system 845. Light transmitted by the second field aperture 825 is then incident onto a second optical relay spectrometer system 895, which is capable of substantially receiving a portion of the light from the second field aperture 825 and substantially dispersing, redirecting, and reimaging the light from the second field aperture 825 onto a second portion of the detecting element 970.

Figure 6D:
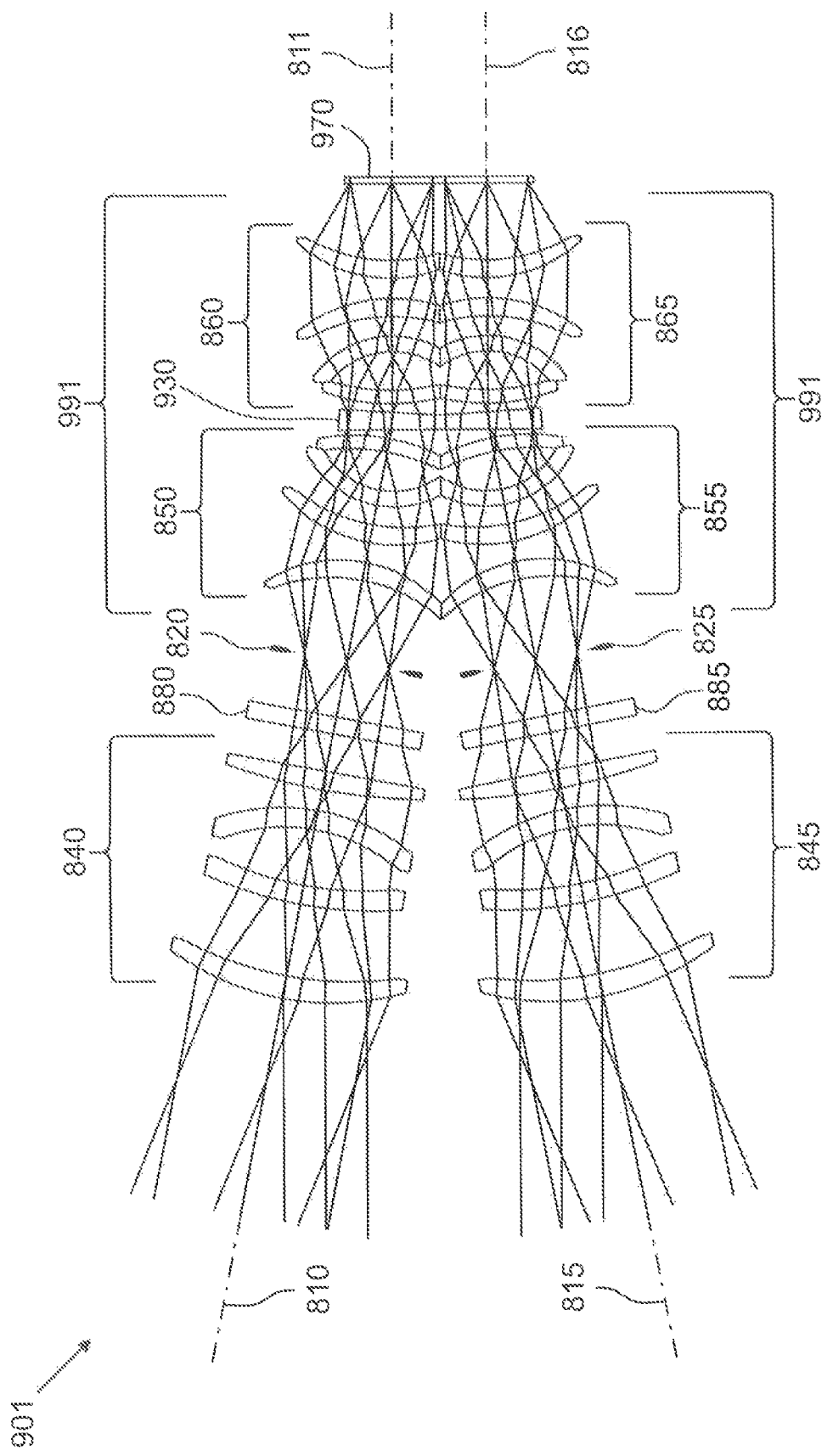
FIG. 6D is a schematic view of another embodiment of the present teachings, consisting of portions of the embodiments illustrated in FIGS. 6A and 6B, taken along the plane perpendicular to the direction of dispersion.

Reference is made to FIG. 6D, which is a schematic view of another embodiment of the present teachings 901 taken along the plane containing its optical axes 810 and 815, and in the plane perpendicular to the direction of dispersion. In operation, light, emitted or reflected by a first portion of the source (not shown), is incident onto a first optical system 840, which is capable of substantially receiving a portion of the light from the first portion of the source and focusing the light. The light is then incident onto a first optional window 880, which is included in the optical path in some embodiments. The first optional window 880 is capable of substantially receiving a portion of the light from the first optical system 840 and substantially transmitting the focusing light onto a first field aperture 820, which is capable of substantially receiving the light from the first optical system 840.

Light transmitted by the first field aperture 820 is then incident onto a first half 850 of an optical relay spectrometer system 991, which is capable of substantially receiving a portion of the light from the first field aperture 820. The light is then incident onto a first portion of a dispersing and redirecting element 930, which is capable of substantially receiving the light from the first half 850 of the optical relay spectrometer system 991 and substantially dispersing the light in a first direction and redirecting the light in a second direction. The dispersed and redirected light is then incident onto a second half 860 of the optical relay spectrometer system 991, which is capable of substantially receiving a portion of the dispersed and redirected light from the first portion of the dispersing and redirecting element 930 and substantially focusing the dispersed and redirected light onto a first portion of a detecting element 970. Light, emitted or reflected by a second portion of the source (not shown), is incident onto a second optical system 845, which is capable of substantially receiving a portion of the light from second portion of the source and focusing the light. The light is then incident onto a second optional window 885, which is included in the optical path in some embodiments. The second optional window 885 is capable of substantially receiving a portion of the light from the second optical system 845 and substantially transmitting the focusing light onto a second field aperture 825, which is capable of substantially receiving the light from the second optical system 845. Light transmitted by the second field aperture 825 is then incident onto a third half 855 of the optical relay spectrometer system 991, which is capable of substantially receiving a portion of the light from the second field aperture 825. The light is then incident onto a second portion of a dispersing and redirecting element 930, which is capable of substantially receiving the light from third half 855 of the optical relay spectrometer system 991 and substantially dispersing the light substantially in the same first direction and redirecting the light in a third direction. The dispersed and redirected light is then incident onto a fourth half 865 of the optical relay spectrometer system 991, which is capable of substantially receiving a portion of the dispersed and redirected light from the second portion of the dispersing and redirecting element 930 and substantially focusing the dispersed and redirected light onto a second portion of a detecting element 970.

Figure 6E:
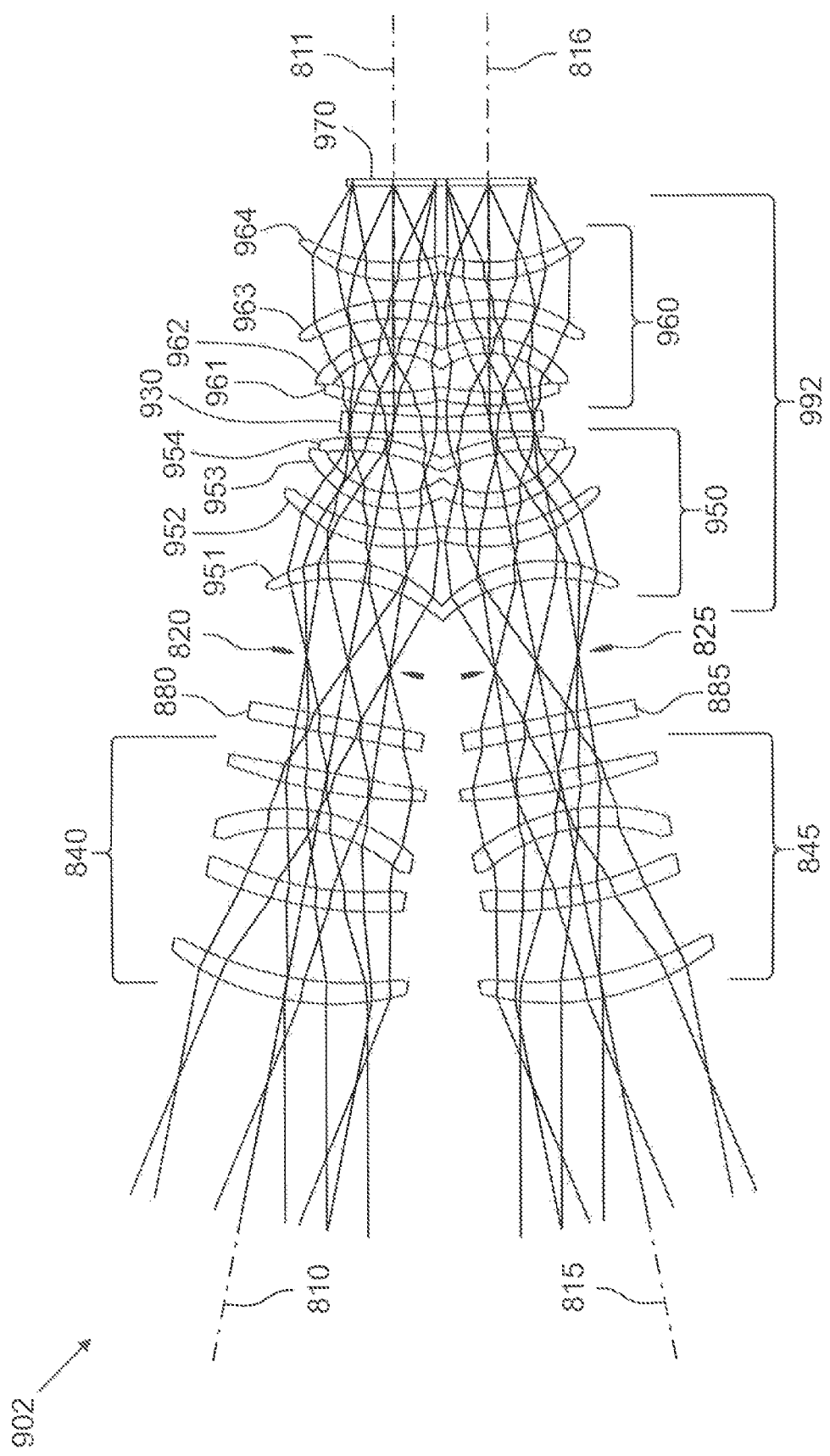
FIG. 6E is a schematic view of still another embodiment of the present teachings, consisting of portions of the embodiments illustrated in FIGS. 6A and 6B, taken along the plane perpendicular to the direction of dispersion.

Reference is made to FIG. 6E, which is a schematic view of still another embodiment of the present teachings 902 taken along the plane containing its optical axes 810 and 815, and in the plane perpendicular to the direction of dispersion. In operation, light, emitted or reflected by a first portion of the source (not shown), is incident onto a first optical system 840, which is capable of substantially receiving a portion of the light from the first portion of the source and focusing the light. The light is then incident onto a first optional window 880, which is included in the optical path in some embodiments. The first optional window 880 is capable of substantially receiving a portion of the light from the first optical system 840 and substantially transmitting the focusing light onto a first field aperture 820, which is capable of substantially receiving the light from the first optical system 840. Light transmitted by the first field aperture 820 is then incident onto a first portion of a first half 950 of an optical relay spectrometer system 992, in this embodiment made up of, but not limited to, four refractive elements 951, 952, 953, and 954, which is capable of substantially receiving a portion of the light from the first field aperture 820. The light is then incident onto a first portion of a dispersing and redirecting element 930, which is capable of substantially receiving the first portion of the light from the first half 950 of the optical relay spectrometer system 992 and substantially dispersing the light in a first direction and redirecting the light in a second direction. The dispersed and redirected light is then incident onto a first portion of a second half 960 of the optical relay spectrometer system 992, which is capable of substantially receiving a portion of the dispersed and redirected light from the first portion of the dispersing and redirecting element 930 and substantially focusing the dispersed and redirected light onto a first portion of a detecting element 970. Light, emitted or reflected by a second portion of the source (not shown), is incident onto a second optical system 845, which is capable of substantially receiving a portion of the light from the second portion of the source and focusing the light. The light is then incident onto a second optional window 885, which is included in the optical path in some embodiments. The second optional window 885 is capable of substantially receiving a portion of the light from the second optical system 845 and substantially transmitting the focusing light onto a second field aperture 825, which is capable of substantially receiving the light from the second optical system 845. Light transmitted by the second field aperture 825 is then incident onto a second portion of the first half 950 of the optical relay spectrometer system 992, which is capable of substantially receiving a portion of the light from the second field aperture 825. The light is then incident onto a second portion of the dispersing and redirecting element 930, which is capable of substantially receiving the light from the second portion of the first half 950 of the optical relay spectrometer system 992 and substantially dispersing the light substantially in the same first direction and redirecting the light in a third direction. The dispersed and redirected light is then incident onto a second portion of the second half 960 of the optical relay spectrometer system 992, which is capable of substantially receiving a portion of the dispersed and redirected light from the second portion of the dispersing and redirecting element 930 and substantially focusing the dispersed and redirected light onto a second portion of a detecting element 970.

Reference is made to FIG. 7A, which is a schematic view of an embodiment of the present teachings 1000 taken along the plane containing its optical axis 1010, and in the plane perpendicular to the direction of dispersion. In operation, light, emitted or reflected by a portion of the source (not shown), is incident onto an optical system 1040, in this embodiment made up of, but not limited to, four refractive elements 1041, 1042, 1043, and 1044, which is capable of substantially receiving a portion of the light from the source and focusing the light. The light is then incident onto an optional window 1080, which is included in the optical path in some embodiments and is oriented substantially perpendicular to the optical axis 1011. The optional window 1080 is capable of substantially receiving a portion of the light from the optical system 1040 and substantially transmitting the focusing light onto a field aperture 1020, which is capable of substantially receiving the light from the optical system 1040. Light transmitted by the field aperture 1020 is then incident onto a first half 1050 of an optical relay spectrometer system 1090, in this embodiment made up of, but not limited to, four refractive elements 1051, 1052, 1053, and 1054, which is capable of substantially receiving a portion of the light from the field aperture 1020. The light is then incident onto a dispersing and redirecting element 1030, which is capable of substantially receiving the light from the first half 1050 of the optical relay spectrometer system 1090 and substantially dispersing the light in a first direction and redirecting the light in a second direction. The dispersed and redirected light is then incident onto a second half 1060 of the optical relay spectrometer system 1090, in this embodiment made up of, but not limited to, four refractive elements 1061, 1062, 1063, and 1064, which is capable of substantially receiving a portion of the dispersed and redirected light from the dispersing and redirecting element 1030 and substantially focusing the dispersed and redirected light onto a detecting element 1070.

Reference is made to FIG. 7B, which is a schematic view of another embodiment of the present teachings 1005 taken along the plane containing its optical axis 1015, and in the plane perpendicular to the direction of dispersion. In operation, light, emitted or reflected by a portion of the source (not shown), is incident onto an optical system 1045, in this embodiment made up of, but not limited to, four refractive elements 1046, 1047, 1048, and 1049, which is capable of substantially receiving a portion of the light from the source and focusing the light. The light is then incident onto an optional window 1085, which is included in the optical path in some embodiments and is oriented substantially perpendicular to the optical axis 1016. The optional window 1085 is capable of substantially receiving a portion of the light from the optical system 1045 and substantially transmitting the focusing light onto a field aperture 1025, which is capable of substantially receiving the light from the optical system 1045. Light transmitted by the field aperture 1025 is then incident onto a first half 1055 of an optical relay spectrometer system 1095, in this embodiment made up of, but not limited to, four refractive elements 1056, 1057, 1058, and 1059, which is capable of substantially receiving a portion of the light from the field aperture 1025. The light is then incident onto a dispersing and redirecting element 1035, which is capable of substantially receiving the light from the first half 1055 of the optical relay spectrometer system 1095 and substantially dispersing the light in a first direction and redirecting the light in a second direction. The dispersed and redirected light is then incident onto a second half 1065 of the optical relay spectrometer system 1095, in this embodiment made up of, but not limited to, four refractive elements 1066, 1067, 1068, and 1069, which is capable of substantially receiving a portion of the dispersed and redirected light from the dispersing and redirecting element 1035 and substantially focusing the dispersed and redirected light onto a detecting element 1070.

Figure 7C:
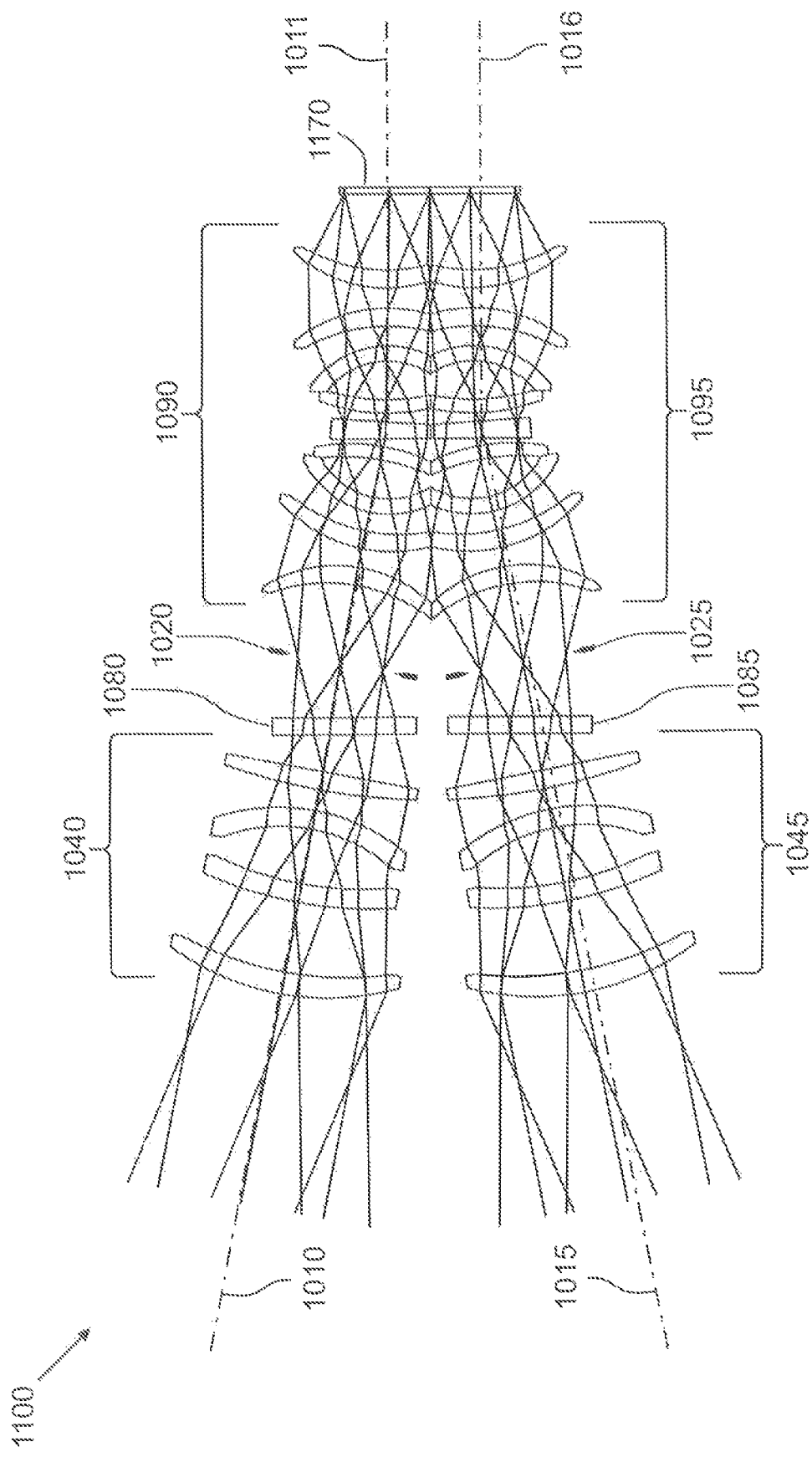
FIG. 7C is a schematic view of an embodiment of the present teachings, consisting of portions of the embodiments illustrated in FIGS. 7A and 7B, taken along the plane perpendicular to the direction of dispersion.

Reference is made to FIG. 7C, which is a schematic view of an embodiment of the present teachings 1100 taken along the plane containing its optical axes 1010 and 1015, and in the plane perpendicular to the direction of dispersion. In operation, light, emitted or reflected by a first portion of the source (not shown), is incident onto a first optical system 1040, which is capable of substantially receiving a portion of the light from the first portion of the source and focusing the light. The light is then incident onto a first optional window 1080, which is included in the optical path in some embodiments and is oriented substantially perpendicular to the optical axis 1011. The first optional window 1080 is capable of substantially receiving a portion of the light from the first optical system 1040 and substantially transmitting the focusing light onto a first field aperture 1020, which is capable of substantially receiving the light from the first optical system 1040. Light transmitted by the first field aperture 1020 is then incident onto a first optical relay spectrometer system 1090, which is capable of substantially receiving a portion of the light from the first field aperture 1020 and substantially dispersing, redirecting, and reimaging the light from the first field aperture 1020 onto a first portion of a detecting element 1170. Light, emitted or reflected by a second portion of the source (not shown), is incident onto a second optical system 1045, which is capable of substantially receiving a portion of the light from the second portion of the source and focusing the light. The light is then incident onto a second optional window 1085, which is included in the optical path in some embodiments and is oriented substantially perpendicular to the optical axis 1016. The second optional window 1085 is capable of substantially receiving a portion of the light from the second optical system 1045 and substantially transmitting the focusing light onto a second field aperture 1025, which is capable of substantially receiving the light from the second optical system 1045. Light transmitted by the second field aperture 1025 is then incident onto a second optical relay spectrometer system 1095, which is capable of substantially receiving a portion of the light from the second field aperture 1025 and substantially dispersing, redirecting, and reimaging the light from the second field aperture 1025 onto a second portion of the detecting element 1170.

Figure 7D:
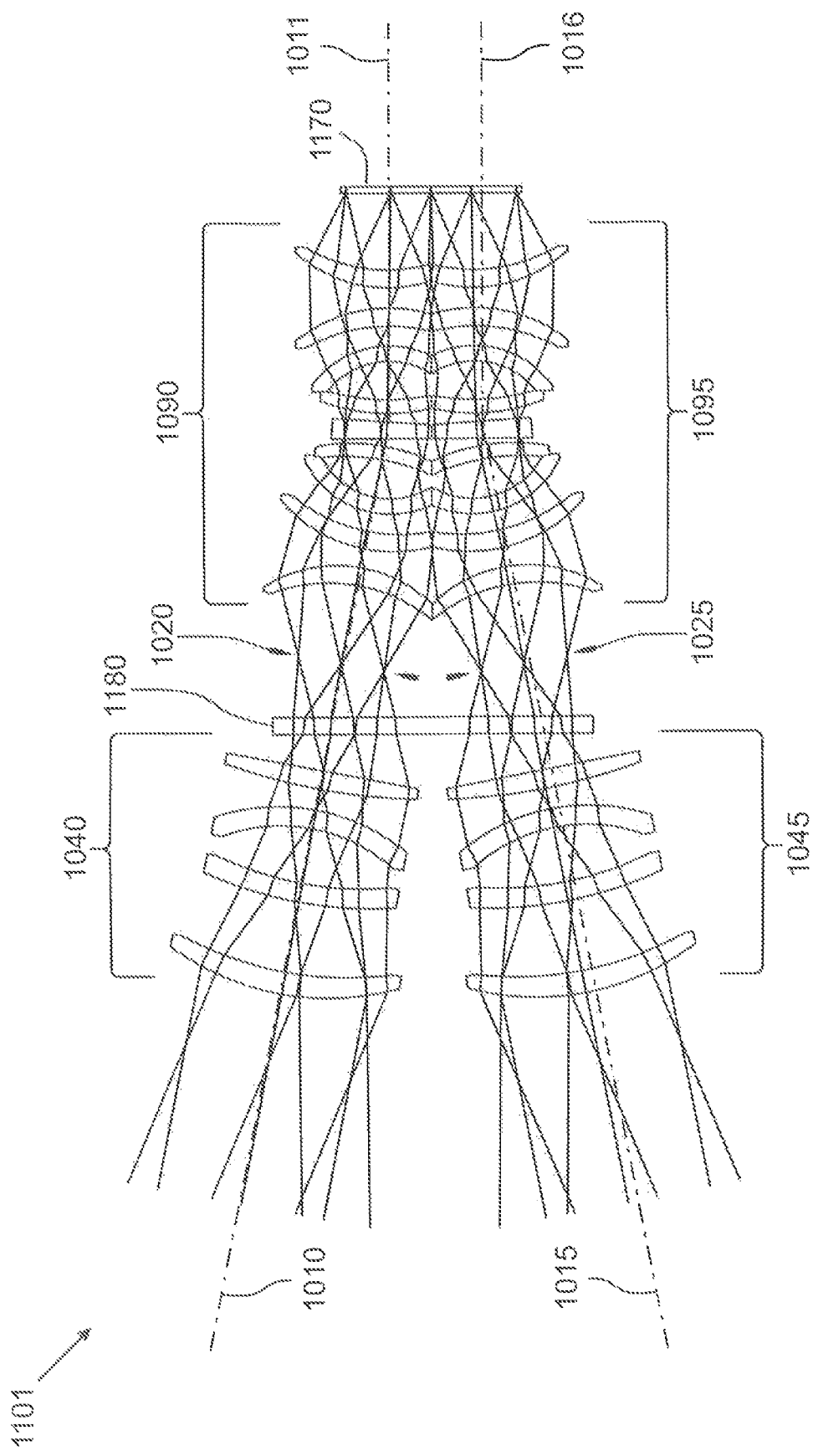
FIG. 7D is a schematic view of another embodiment of the present teachings, consisting of portions of the embodiments illustrated in FIGS. 7A and 7B, taken along the plane perpendicular to the direction of dispersion.

Reference is made to FIG. 7D, which is a schematic view of another embodiment of the present teachings 1101 taken along the plane containing its optical axes 1010 and 1015, and in the plane perpendicular to the direction of dispersion. In operation, light, emitted or reflected by a first portion of the source (not shown), is incident onto a first optical system 1040, which is capable of substantially receiving a portion of the light from the first portion of the source and focusing the light. The light is then incident onto a first portion of an optical window 1180, which is capable of substantially receiving a portion of the light from the first optical system 1040 and substantially transmitting the focusing light onto a first field aperture 1020, which is capable of substantially receiving the light from the optical system 1040. Light transmitted by the first field aperture 1020 is then incident onto a first optical relay spectrometer system 1090, which is capable of substantially receiving a portion of the light from the first field aperture 1020 and substantially dispersing, redirecting, and reimaging the light from the first field aperture 1020 onto a first portion of a detecting element 1170. Light, emitted or reflected by a second portion of the source (not shown), is incident onto a second optical system 1045, which is capable of substantially receiving a portion of the light from the second portion of the source and focusing the light. The light is then incident onto a second portion of the optical window 1180, which is capable of substantially receiving a portion of the light from the second optical system 1045 and substantially transmitting the focusing light onto a second field aperture 1025, which is capable of substantially receiving the light from the optical system 1045. Light transmitted by the second field aperture 1025 is then incident onto a second optical relay spectrometer system 1095, which is capable of substantially receiving a portion of the light from the second field aperture 1025 and substantially dispersing, redirecting, and reimaging the light from the second field aperture 1025 onto a second portion of the detecting element 1170.

Reference is made to FIG. 8A, which is a schematic view of an embodiment of the present teachings 1200 taken along the plane containing its optical axis 1210, and in the plane perpendicular to the direction of dispersion. In operation, light, emitted or reflected by a portion of the source (not shown), is incident onto an optical system 1240, in this embodiment made up of, but not limited to, four refractive elements 1241, 1242, 1243, and 1244, which is capable of substantially receiving a portion of the light from the source and focusing the light. The light is then incident onto an axis bending element 1280, which is capable of substantially bending the optical axis 1210 onto the optical axis 1211. In this embodiment, the axis bending element 1280 is further capable of receiving a portion of the light from the optical system 1240 and substantially redirecting the focusing light onto a field aperture 1220, which is capable of substantially receiving the light from the axis bending element 1280. Light transmitted by the field aperture 1220 is then incident onto a first half 1250 of an optical relay spectrometer system 1290, in this embodiment made up of, but not limited to, four refractive elements 1251, 1252, 1253, and 1254, which is capable of substantially receiving a portion of the light from the field aperture 1220. The light is then incident onto a dispersing element 1230, which is capable of substantially receiving the light from the first half 1250 of the optical relay spectrometer system 1290 and substantially dispersing the light. The dispersed light is then incident onto a second half 1260 of the optical relay spectrometer system 1290, in this embodiment made up of, but not limited to, four refractive elements 1261, 1262, 1263, and 1264, which is capable of substantially receiving a portion of the dispersed light from the dispersing element 1230 and substantially focusing the dispersed light onto a detecting element 1270.

Reference is made to FIG. 8B, which is a schematic view of another embodiment of the present teachings 1205 taken along the plane containing its optical axis 1215, and in the plane perpendicular to the direction of dispersion. In operation, light, emitted or reflected by a portion of the source (not shown), is incident onto an optical system 1245, in this embodiment made up of, but not limited to, four refractive elements 1246, 1247, 1248, and 1249, which is capable of substantially receiving a portion of the light from the source and focusing the light. The light is then incident onto an axis bending element 1285, which is capable of substantially bending the optical axis 1215 onto the optical axis 1216. In this embodiment, the axis bending element 1285 is further capable of receiving a portion of the light from the optical system 1245 and substantially redirecting the focusing light onto a field aperture 1225, which is capable of substantially receiving the light from the axis bending element 1285. Light transmitted by the field aperture 1225 is then incident onto a first half 1255 of an optical relay spectrometer system 1295, in this embodiment made up of, but not limited to, four refractive elements 1256, 1257, 1258, and 1259, which is capable of substantially receiving a portion of the light from the field aperture 1225. The light is then incident onto a dispersing element 1235, which is capable of substantially receiving the light from the first half 1255 of the optical relay spectrometer system 1295 and substantially dispersing the light. The dispersed light is then incident onto a second half 1265 of the optical relay spectrometer system 1295, in this embodiment made up of, but not limited to, four refractive elements 1266, 1267, 1268, and 1269, which is capable of substantially receiving a portion of the dispersed light from the dispersing element 1235 and substantially focusing the dispersed light onto a detecting element 1275.

Figure 8C:
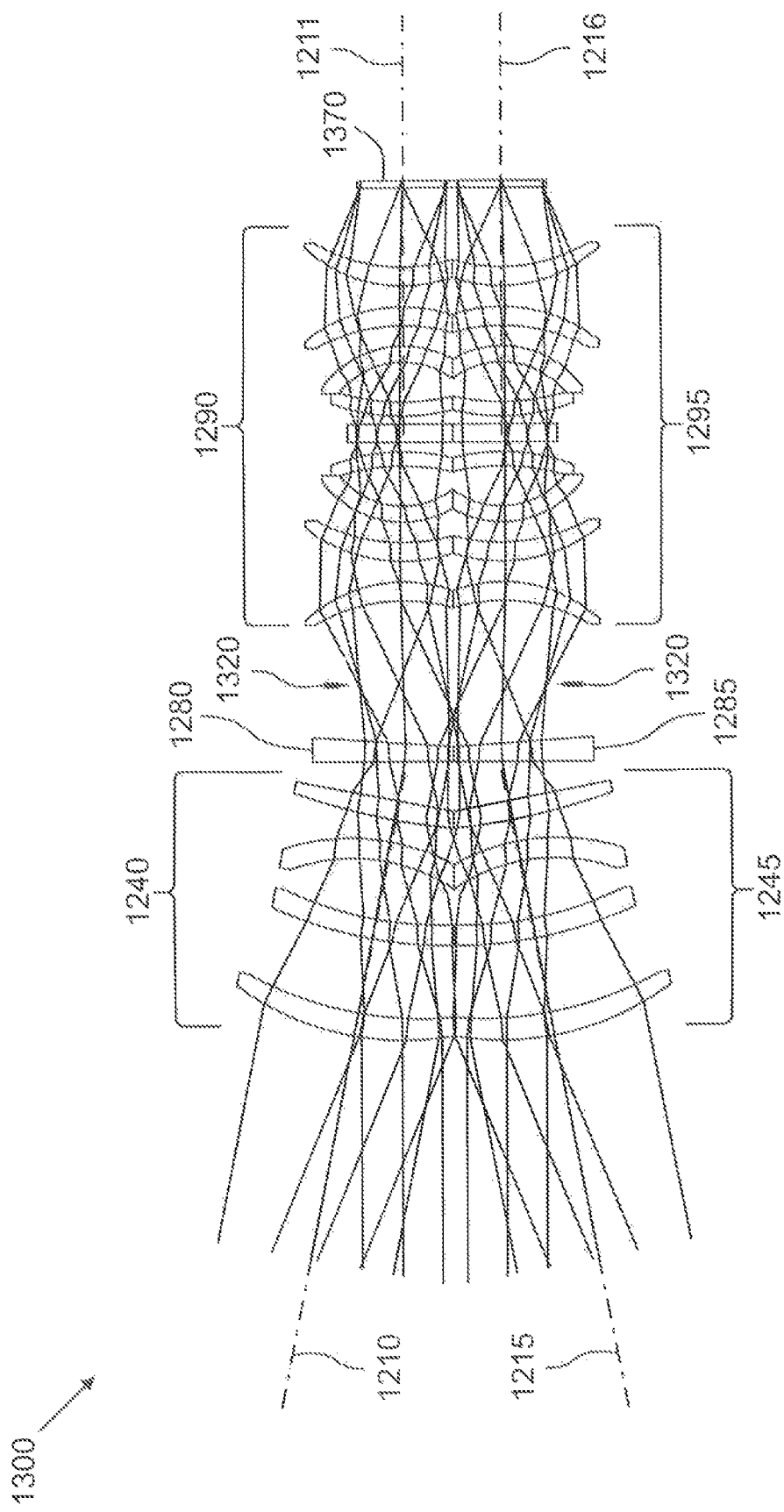
FIG. 8C is a schematic view of an embodiment of the present teachings, consisting of portions of the embodiments illustrated in FIGS. 8A and 8B, taken along the plane perpendicular to the direction of dispersion.

Reference is made to FIG. 8C, which is a schematic view of an embodiment of the present teachings 1300 taken along the plane containing its optical axes 1210 and 1215, and in the plane perpendicular to the direction of dispersion. In operation, light, emitted or reflected by a first portion of the source (not shown), is incident onto a first optical system 1240, which is capable of substantially receiving a portion of the light from the first portion of the source and focusing the light. The light is then incident onto a first axis bending element 1280, which is capable of substantially bending the optical axis 1210 onto the optical axis 1211. In this embodiment, the axis bending element 1280 is further s capable of receiving a portion of the light from the first optical system 1240 and substantially redirecting the focusing light onto a first field aperture 1220, which is capable of substantially receiving the light from the first axis bending element 1280. Light transmitted by the first field aperture 1220 is then incident onto a first optical relay spectrometer system 1290, which is capable of substantially receiving a portion of the light from the first field aperture 1220 and substantially dispersing and reimaging the light from the first field aperture 1220 onto a first portion of a detecting element 1370. Light, emitted or reflected by a second portion of the source (not shown), is incident onto a second optical system 1245, which is capable of substantially receiving a portion of the light from the second portion of the source and focusing the light. The light is then incident onto a second axis bending element 1285, which is capable of substantially bending the optical axis 1215 onto the optical axis 1216. In this embodiment, the axis bending element 1285 is further capable of receiving a portion of the light from the second optical system 1245 and substantially redirecting the focusing light onto a second field aperture 1205, which is capable of substantially receiving the light from the second axis bending element 1285. Light transmitted by the second field aperture 1225 is then incident onto a second optical relay spectrometer system 1295, which is capable of substantially receiving a portion of the light from the second field aperture 1225 and substantially dispersing and reimaging the light from the second field aperture 1225 onto a second portion of the detecting element 1370.

Figure 8D:
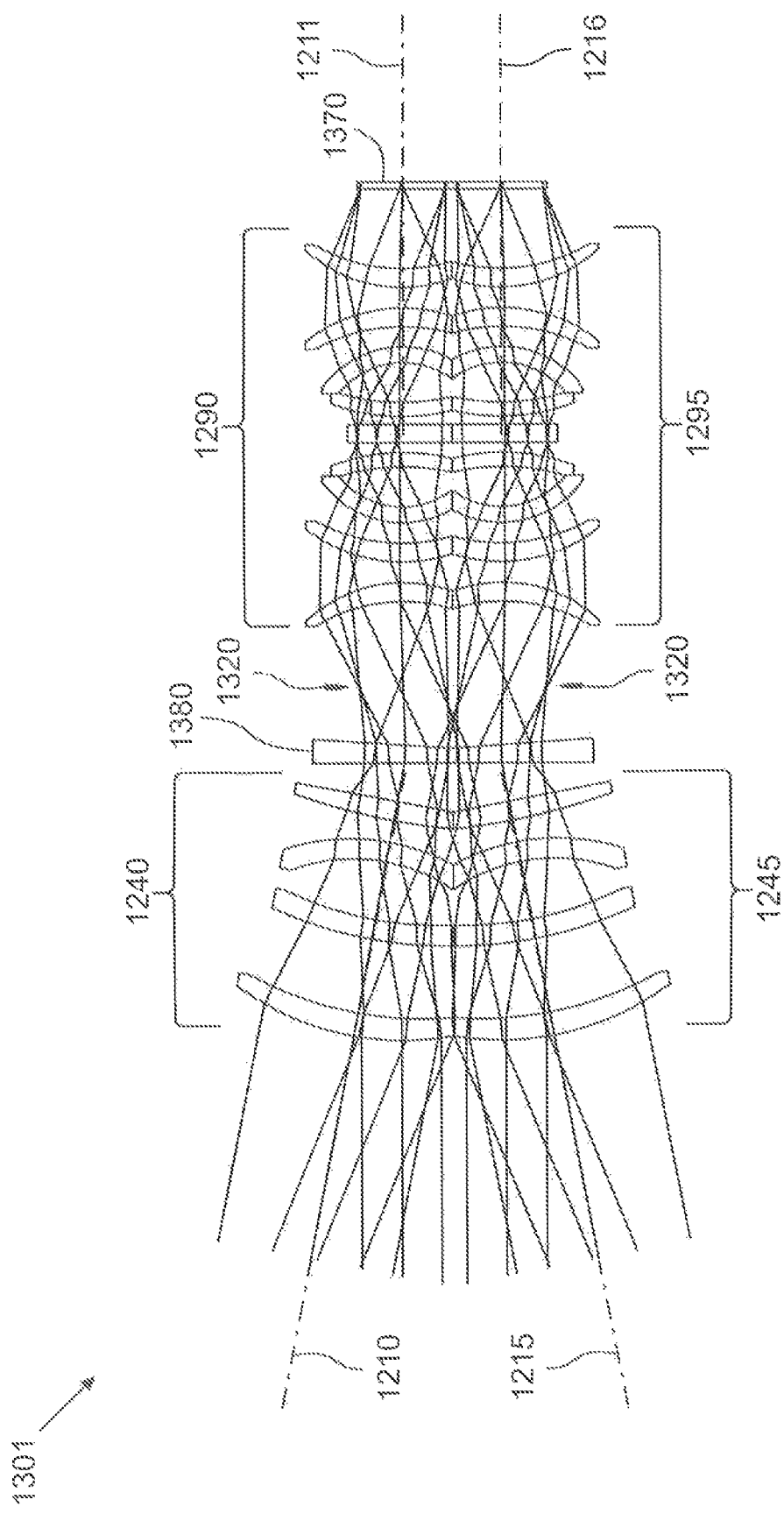
FIG. 8D is a schematic view of another embodiment of the present teachings, consisting of portions of the embodiments illustrated in FIGS. 8A and 8B, taken along the plane perpendicular to the direction of dispersion.

Reference is made to FIG. 8D, which is a schematic view of another embodiment of the present teachings 1301 taken along the plane containing its optical axes 1210 and 1215, and in the plane perpendicular to the direction of dispersion. In operation, light, emitted or reflected by a first portion of the source (not shown), is incident onto a first optical system 1240, which is capable of substantially receiving a portion of the light from the first portion of the source and focusing the light. The light is then incident onto a first portion of an axis bending element 1380, which is capable of substantially bending the optical axis 1210 onto the optical axis 1211. In this embodiment, the axis bending element 1380 is further capable of receiving a portion of the light from the first optical system 1240 and substantially redirecting the focusing light onto a first field aperture 1220, which is capable of substantially receiving the light from the first portion of the axis bending element 1380. Light transmitted by the first field aperture 1220 is then incident onto a first optical relay spectrometer system 1290, which is capable of substantially receiving a portion of the light from the first field aperture 1220 and substantially dispersing and reimaging the light from the first field aperture 1220 onto a first portion of a detecting element 1370. Light, emitted or reflected by a second portion of the source (not shown), is incident onto a second optical system 1245, which is capable of substantially receiving a portion of the light from the second portion of the source and focusing the light. The light is then incident onto a second portion of the axis bending element 1380, which is capable of substantially bending the optical axis 1215 onto the optical axis 1216. In this embodiment, the axis bending element 1380 is further capable of receiving a portion of the light from the second optical system 1245 and substantially redirecting the focusing light onto a second field aperture 1205, which is capable of substantially receiving the light from the second portion of the axis bending element 1380. Light transmitted by the second field aperture 1225 is then incident onto a second optical relay spectrometer system 1295, which is capable of substantially receiving a portion of the light from the second field aperture 1225 and substantially dispersing and reimaging the light from the second field aperture 1225 onto a second portion of the detecting element 1370.

Figure 8E:
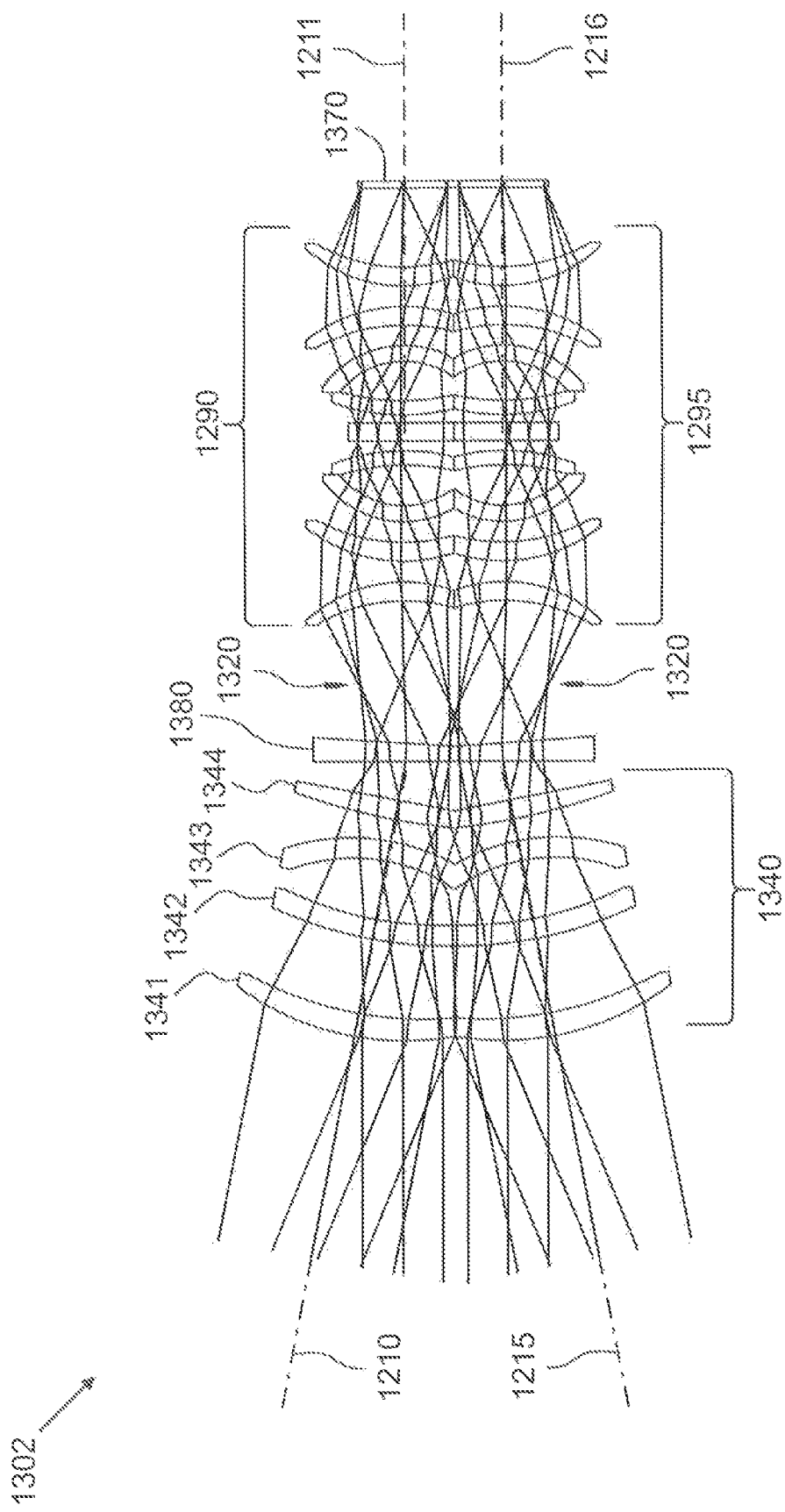
FIG. 8E is a schematic view of still another embodiment of the present teachings, consisting of portions of the embodiments illustrated in FIGS. 8A and 8B, taken along the plane perpendicular to the direction of dispersion.

Reference is made to FIG. 8E, which is a schematic view of still another embodiment of the present teachings 1302 taken along the plane containing its optical axes 1210 and 1215, and in the plane perpendicular to the direction of dispersion. In operation, light, emitted or reflected by a first portion of the source (not shown), is incident onto a first portion of an optical system 1340, in this embodiment made up of, but not limited to, four refractive elements 1341, 1342, 1343, and 1344, which is capable of substantially receiving a portion of the light from the first portion of the source and focusing the light. The light is then incident onto a first portion of an axis bending element 1380, which is capable of substantially bending the optical axis 1210 onto the optical axis 1211. In this embodiment, the axis bending element 1380 is further capable of receiving a portion of the light from the first portion of the optical system 1340 and substantially redirecting the focusing light onto a first field aperture 1220, which is capable of substantially receiving the light from the first portion of the axis bending element 1380. Light transmitted by the first field aperture 1220 is then incident onto a first optical relay spectrometer system 1290, which is capable of substantially receiving a portion of the light from the first field aperture 1220 and substantially dispersing and reimaging the light from the first field aperture 1220 onto a first portion of a detecting element 1370. Light, emitted or reflected by a second portion of the source (not shown), is incident onto a second portion of the optical system 1340, which is capable of substantially receiving a portion of the light from the second portion of the source and focusing the light. The light is then incident onto a second portion of the axis bending element 1380, which is capable of substantially bending the optical axis 1215 onto the optical axis 1216. In this embodiment, the axis bending element 1380 is further capable of substantially receiving a portion of the light from the second portion of the optical system 1340 and substantially redirecting the focusing light onto a second field aperture 1205, which is capable of substantially receiving the light from the second portion of the axis bending element 1380. Light transmitted by the second field aperture 1225 is then incident onto a second optical relay spectrometer system 1295, which is capable of substantially receiving a portion of the light from the second field aperture 1225 and substantially dispersing and reimaging the light from the second field aperture 1225 onto a second portion of the detecting element 1370.

Reference is made to FIG. 9A, which is a schematic view of an embodiment of the present teachings 1400 taken along the plane containing its optical axis 1410, and in the plane perpendicular to the direction of dispersion. In operation, light, emitted or reflected by a portion of the source (not shown), is incident onto an optical system 1440, in this embodiment made up of, but not limited to, four refractive elements 1441, 1442, 1443, and 1444, which is capable of substantially receiving a portion of the light from the source and focusing the light. The light is then incident onto an optional window 1480, which is included in the optical path in some embodiments. The optional window 1480 is capable of substantially receiving a portion of the light from the optical system 1440 and substantially transmitting the focusing light onto a field aperture 1420, which is capable of substantially receiving the light from the optical system 1440. Light transmitted by the field aperture 1420 is then incident onto a first half 1450 of an optical relay spectrometer system 1490, in this embodiment made up of, but not limited to, four refractive elements 1451, 1452, 1453, and 1454, which is capable of substantially receiving a portion of the light from the field aperture 1420. The light is then incident onto a dispersing element 1430, which is capable of substantially receiving the light from the first half 1450 of the optical relay spectrometer system 1490 and substantially dispersing the light. The dispersed light is then incident onto a second half 1460 of the optical relay spectrometer system 1490, in this embodiment made up of, but not limited to, four refractive elements 1461, 1462, 1463, and 1464, where the optical axis 1412 of the second half 1460 of the optical relay spectrometer system 1490 is substantially offset (also referred to as "displaced" and the two terms are used interchangeably in practice) from the optical axis 1411. The second half 1460 on the optical relay spectrometer system 1490 is capable of substantially receiving a portion of the dispersed light from the dispersing element 1430 and substantially focusing the dispersed light onto a detecting element 1470.

Reference is made to FIG. 9B, which is a schematic view of another embodiment of the present teachings 1405 taken along the plane containing its optical axis 1415, and in the plane perpendicular to the direction of dispersion. In operation, light, emitted or reflected by a portion of the source (not shown), is incident onto an optical system 1445, in this embodiment made up of, but not limited to, four refractive elements 1446, 1447, 1448, and 1449, which is capable of substantially receiving a portion of the light from the source and focusing the light. The light is then incident onto an optional window 1485, which is included in the optical path in some embodiments. The optional window 1485 is capable of substantially receiving a portion of the light from the optical system 1445 and substantially transmitting the focusing light onto a field aperture 1425, which is capable of substantially receiving the light from the optical system 1445. Light transmitted by the field aperture 1425 is then incident onto a first half 1455 of an optical relay spectrometer system 1495, in this embodiment made up of, but not limited to, four refractive elements 1456, 1457, 1458, and 1459, which is capable of substantially receiving a portion of the light from the field aperture 1425. The light is then incident onto a dispersing element 1435, which is capable of substantially receiving the light from the first half 1455 of the optical relay spectrometer system 1495 and substantially dispersing the light. The dispersed light is then incident onto a second half 1465 of the optical relay spectrometer system 1495, in this embodiment made up of, but not limited to, four refractive elements 1466, 1467, 1468, and 1469, where the optical axis 1417 of the second half 1465 of the optical relay spectrometer system 1495 is substantially offset from the optical axis 1416. The second half 1465 on the optical relay spectrometer system 1495 is capable of substantially receiving a portion of the dispersed light from the dispersing element 1435 and substantially focusing the dispersed light onto a detecting element 1475.

Figure 9C:
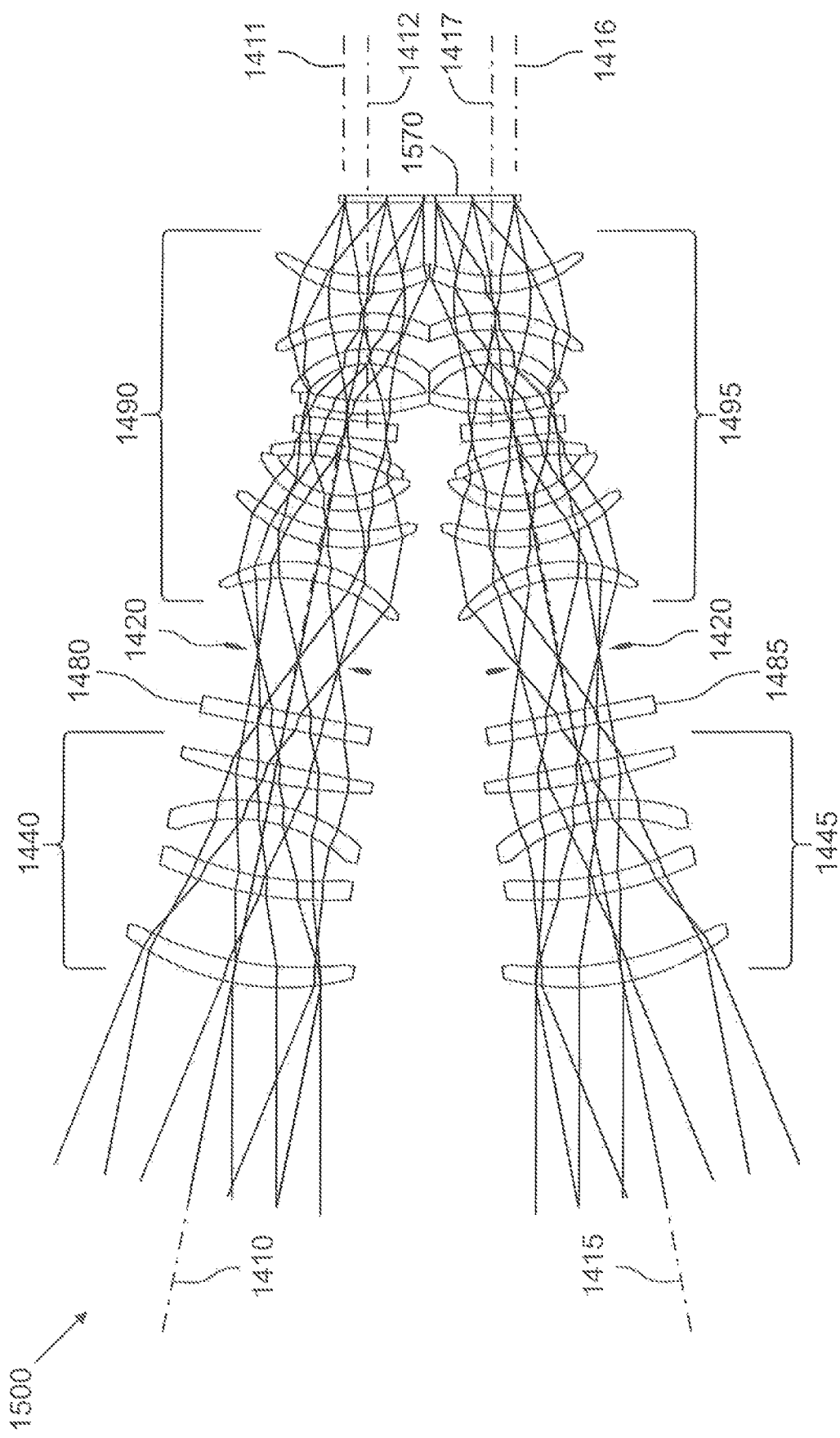
FIG. 9C is a schematic view of an embodiment of the present teachings, consisting of portions of the embodiments illustrated in FIGS. 9A and 9B, taken along the plane perpendicular to the direction of dispersion.

Reference is made to FIG. 9C, which is a schematic view of an embodiment of the present teachings 1500 taken along the plane containing its optical axes 1410, 1411, 1415, and 1416 and in the plane perpendicular to the direction of dispersion. In operation, light, emitted or reflected by a first portion of the source (not shown), is incident onto a first optical system 1440, which is capable of substantially receiving a portion of the light from the first portion of the source and focusing the light. The light is then incident onto a first optional window 1480, which is included in the optical path in some embodiments. The first optional window 1480 is capable of substantially receiving a portion of the light from the first optical system 1440 and substantially transmitting the focusing light onto a first field aperture 1420, which is capable of substantially receiving the light from the first optical system 1440. Light transmitted by the first field aperture 1420 is then incident onto a first optical relay spectrometer system 1490, which is capable of substantially receiving a portion of the light from the first field aperture 1420 and substantially dispersing and reimaging the light from the first field aperture 1420 onto a first portion of a detecting element 1570. Light, emitted or reflected by a second portion of the source (not shown), is incident onto a second optical system 1445, which is capable of substantially receiving a portion of the light from the second portion of the source and focusing the light. The light is then incident onto a second optional window 1485, which is included in the optical path in some embodiments. The second optional window 1485 is capable of substantially receiving a portion of the light from the second optical system 1445 and substantially transmitting the focusing light onto a second field aperture 1425, which is capable of substantially receiving the light from the second optical system 1445. Light transmitted by the second field aperture 1425 is then incident onto a second optical relay spectrometer system 1495, which is capable of substantially receiving a portion of the light from the second field aperture 1425 and substantially dispersing and reimaging the light from the second field aperture 1425 onto a second portion of the detecting element 1570.

Reference is made to FIG. 10A, which is a schematic view of an embodiment of the present teachings 1600 taken along the plane containing its optical axis 1610, and in the plane perpendicular to the direction of dispersion. In operation, light, emitted or reflected by a portion of the source (not shown), is incident onto an optical system 1640, in this embodiment made up of, but not limited to, four refractive elements 1641, 1642, 1643, and 1644, which is capable of substantially receiving a portion of the light from the source and focusing the light. The light is then incident onto an axis bending element 1680, which is capable of substantially bending the optical axis 1610 onto the optical axis 1611. In this embodiment, the axis bending element 1680 is further capable of receiving a portion of the light from the optical system 1640 and substantially redirecting the focusing light onto a field aperture 1620, which is capable of substantially receiving the light from the axis bending element 1680. Light transmitted by the field aperture 1620 is then incident onto a first half 1650 of an optical relay spectrometer system 1690, in this embodiment made up of, but not limited to, four refractive elements 1651, 1652, 1653, and 1654, which is capable of substantially receiving a portion of the light from the field aperture 1620. The light is then incident onto a dispersing and redirecting element 1630, which is capable of substantially receiving the light from the first half 1650 of the optical relay spectrometer system 1690 and substantially dispersing the light in a first direction and redirecting the light in a second direction. The dispersed and redirected light is then incident onto a second half 1660 of the optical relay spectrometer system 1690, in this embodiment made up of, but not limited to, four refractive elements 1661, 1662, 1663, and 1664, which is capable of substantially receiving a portion of the dispersed and redirected light from the dispersing and redirecting element 1630 and substantially focusing the dispersed and redirected light onto a detecting element 1670.

Reference is made to FIG. 10B, which is a schematic view of another embodiment of the present teachings 1605 taken along the plane containing its optical axis 1615, and in the plane perpendicular to the direction of dispersion. In operation, light, emitted or reflected by a portion of the source (not shown), is incident onto an optical system 1645, in this embodiment made up of, but not limited to, four refractive elements 1646, 1647, 1648, and 1649, which is capable of substantially receiving a portion of the light from the source and focusing the light. The light is then incident onto an axis bending element 1685, which is capable of substantially bending the optical axis 1615 onto the optical axis 1616. In this embodiment, the axis bending element 1685 is further capable of receiving a portion of the light from the optical system 1645 and substantially redirecting the focusing light onto a field aperture 1625, which is capable of substantially receiving the light from the axis bending element 1685. Light transmitted by the field aperture 1625 is then incident onto a first half 1655 of an optical relay spectrometer system 1695, in this embodiment made up of, but not limited to, four refractive elements 1656, 1657, 1658, and 1659, which is capable of substantially receiving a portion of the light from the field aperture 1625. The light is then incident onto a dispersing and redirecting element 1635, which is capable of substantially receiving the light from the first half 1655 of the optical relay spectrometer system 1695 and substantially dispersing the light in a first direction and redirecting the light in a second direction. The dispersed and redirected light is then incident onto a second half 1665 of the optical relay spectrometer system 1695, in this embodiment made up of, but not limited to, four refractive elements 1666, 1667, 1668, and 1669, which is capable of substantially receiving a portion of the dispersed and redirected light from the dispersing and redirecting element 1635 and substantially focusing the dispersed and redirected light onto a detecting element 1675.

Figure 10C:
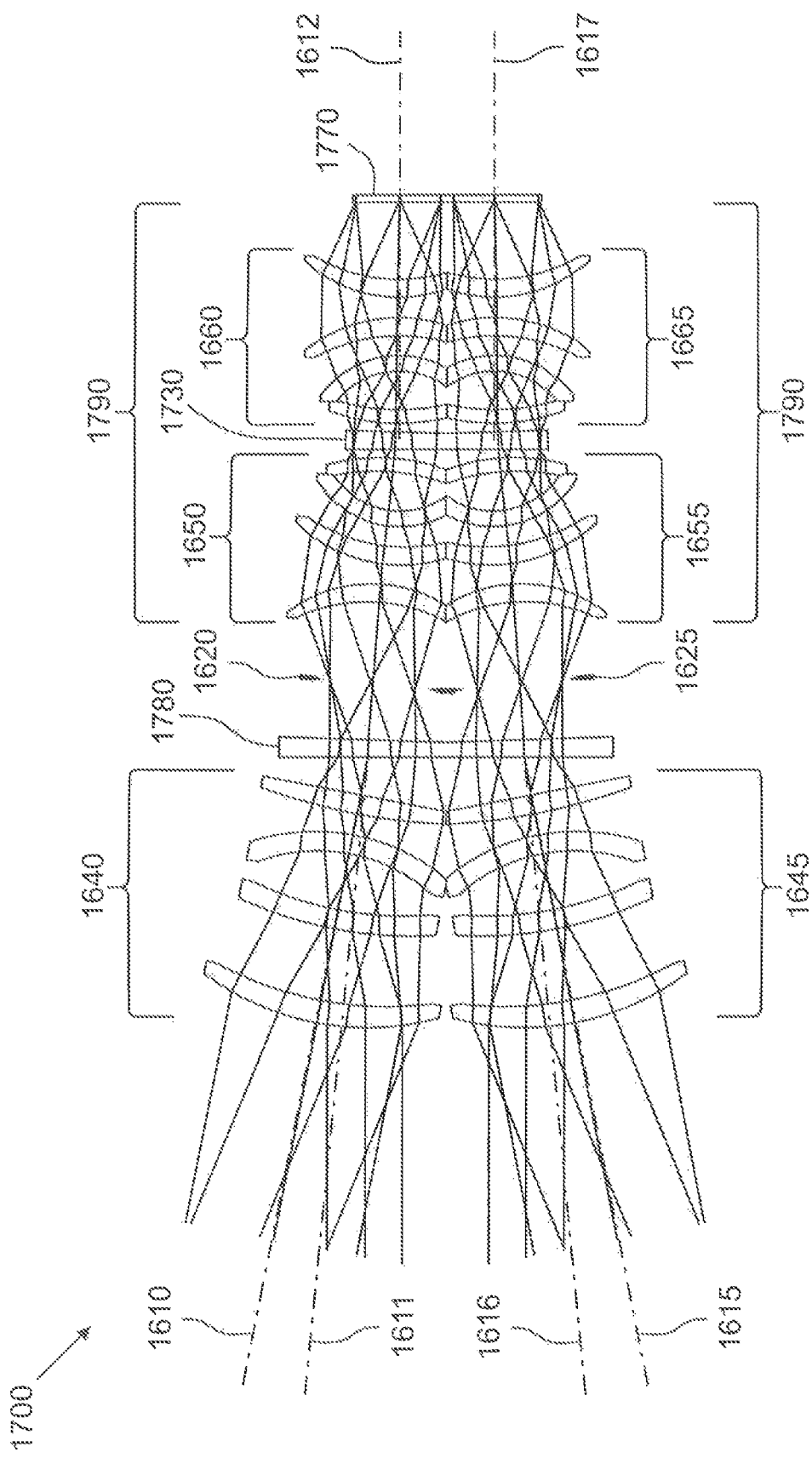
FIG. 10C is a schematic view of an embodiment of the present teachings, consisting of portions of the embodiments illustrated in FIGS. 10A and 10B, taken along the plane perpendicular to the direction of dispersion.

Reference is made to FIG. 10C, which is a schematic view of an embodiment of the present teachings 1700 taken along the plane containing its optical axes 1610 and 1615, and in the plane perpendicular to the direction of dispersion. In operation, light, emitted or reflected by a first portion of the source (not shown), is incident onto a first optical system 1640, which is capable of substantially receiving a portion of the light from the first portion of the source and focusing the light. The light is then incident onto a first portion of an axis bending element 1780, which is capable of substantially bending the optical axis 1610 onto the optical axis 1611. In this embodiment, the axis bending element 1780 is further capable of receiving a portion of the light from the first optical system 1640 and substantially redirecting the focusing light onto a first field aperture 1620, which is capable of substantially receiving the light from the first portion of the axis bending element 1680. Light transmitted by the first field aperture 1620 is then incident onto a first portion 1650 of an optical relay spectrometer system 1790, which is capable of substantially receiving a portion of the light from the first field aperture 1620. The light is then incident onto a first portion of a dispersing and redirecting element 1730, which is capable of substantially receiving the light from the first portion 1650 of the optical relay spectrometer system 1790 and substantially dispersing the light in a first direction and redirecting the light in a second direction. The dispersed and redirected light is then incident onto a second portion 1660 of the optical relay spectrometer system 1790, which is capable of substantially receiving a portion of the dispersed and redirected light from the first portion of the dispersing and redirecting element 1730 and substantially focusing the dispersed and redirected light onto a first portion of a detecting element 1770. Light, emitted or reflected by a second portion of the source (not shown), is incident onto a second optical system 1645, which is capable of substantially receiving a portion of the light from the second portion of the source and focusing the light. The light is then incident onto a second portion of the axis bending element 1780, which is capable of substantially bending the optical axis 1615 onto the optical axis 1616. In this embodiment, the axis bending element 1780 is further capable of receiving a portion of the light from the second optical system 1645 and substantially redirecting the focusing light onto a second field aperture 1605, which is capable of substantially receiving the light from the second portion of the axis bending element 1780. Light transmitted by the second field aperture 1625 is then incident onto a third portion 1655 of the optical relay spectrometer system 1790, which is capable of substantially receiving a portion of the light from the second field aperture 1625. The light is then incident onto a second portion of a dispersing and redirecting element 1730, which is capable of substantially receiving the light from third portion 1655 of the optical relay spectrometer system 1790 and substantially dispersing the light substantially in the same first direction and redirecting the light in a third direction. The dispersed and redirected light is then incident onto a fourth portion 1665 of the optical relay spectrometer system 1790, which is capable of substantially receiving a portion of the dispersed and redirected light from the second portion of the dispersing and redirecting element 1730 and substantially focusing the dispersed and redirected light onto a second portion of a detecting element 1770.

Figure 11A:
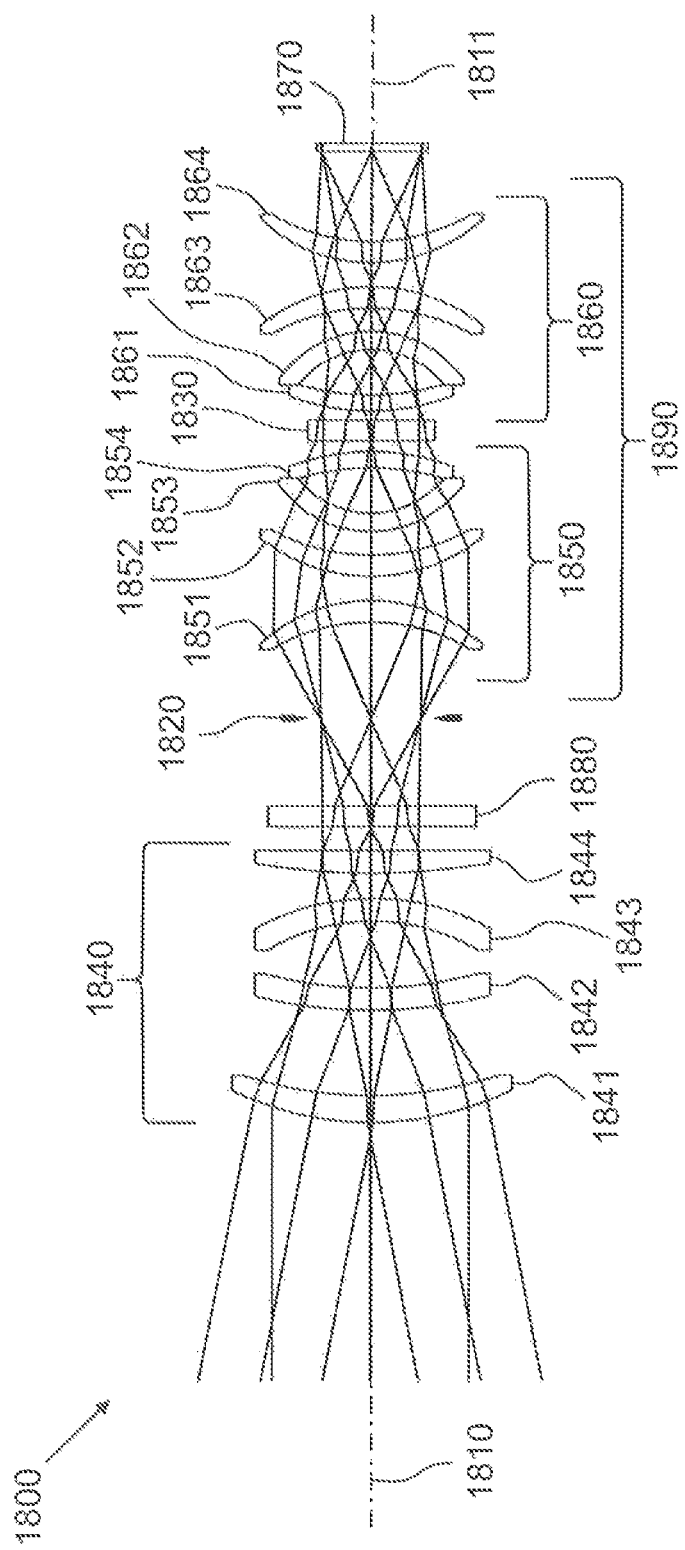
FIG. 11A is a schematic view of an embodiment of the present teachings, taken along its optical axis in the plane perpendicular to the direction of dispersion.

Reference is made to FIG. 11A, which is a schematic view of an embodiment of the present teachings 1800 taken along the plane containing its optical axis 1810, and in the plane perpendicular to the direction of dispersion. In operation, light, emitted or reflected by a source (not shown), is incident onto the optical system 1840, in this embodiment made up of, but not limited to, four refractive elements 1841, 1842, 1843, and 1844, which is capable of substantially receiving a portion of the light from the source and focusing the light. The light is then incident onto an optional window 1880, which is included in the optical path in some embodiments. The optional window 1880 is capable of substantially receiving a portion of the light from the optical system 1840 and substantially redirecting the focusing light onto the field aperture 1820, which is capable of substantially receiving the light from the optical system 1840. Light transmitted by the field aperture 1820 is then incident onto a first half 1850 of an optical relay spectrometer system 1890, in this embodiment made up of, but not limited to, four refractive elements 1851, 1852, 1853, and 1854, which is capable of substantially receiving a portion of the light from the field aperture 1820. The light is then incident onto a dispersing element 1830, which is capable of substantially receiving the light from the first half 1850 of the optical relay spectrometer system 1890 and substantially dispersing the light. The dispersed light is then incident onto a second half 1860 of the optical relay spectrometer system 1890, in this embodiment made up of, but not limited to, four refractive elements 1861, 1862, 1863, and 1864, which is capable of substantially receiving a portion of the dispersed light from the dispersing element 1830 and substantially focusing the dispersed light onto a detecting element 1870.

Figure 11B:
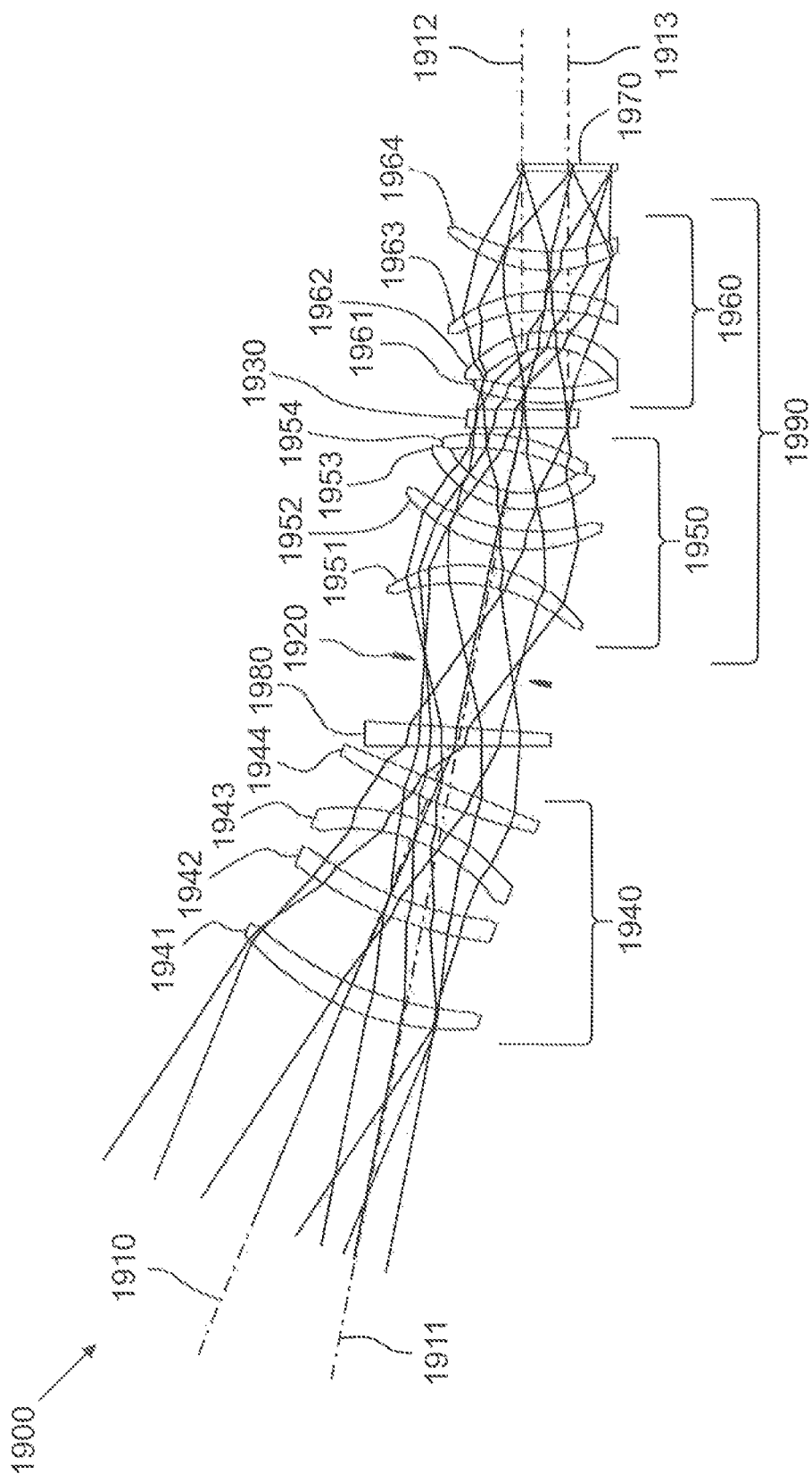
FIG. 11B is a schematic view of another embodiment of the present teachings, taken along its optical axis in the plane perpendicular to the direction of dispersion.

Reference is made to FIG. 11B, which is a schematic view of another embodiment of the present teachings 1900 taken along the plane containing its optical axis 1910, and in the plane perpendicular to the direction of dispersion. In operation, light, emitted or reflected by a portion of the source (not shown), is incident onto an optical system 1940, in this embodiment made up of, but not limited to, four refractive elements 1941, 1942, 1943, and 1944, which is capable of substantially receiving a portion of the light from the source and focusing the light. The light is then incident onto an axis bending element 1980, which is capable of substantially bending the optical axis 1910 onto the optical axis 1911. In this embodiment, the axis bending element 1980 is further capable of receiving a portion of the light from the optical system 1940 and substantially redirecting the focusing light onto a field aperture 1920, which is capable of substantially receiving the light from the axis bending element 1980. Light transmitted by the field aperture 1920 is then incident onto a first half 1950 of an optical relay spectrometer system 1990, in this embodiment made up of, but not limited to, four refractive elements 1951, 1952, 1953, and 1954, which is capable of substantially receiving a portion of the light from the field aperture 1920. The light is then incident onto a dispersing element 1930, which is capable of substantially receiving the light from the first half 1950 of the optical relay spectrometer system 1990 and substantially dispersing the light. The dispersed light is then incident onto a second half 1960 of the optical relay spectrometer system 1990, in this embodiment made up of, but not limited to, four refractive elements 1961, 1962, 1963, and 1964, where the optical axis 1912 of the second half 1960 of the optical relay spectrometer system 1990 is substantially offset from the optical axis 1911. The second half 1960 on the optical relay spectrometer system 1990 is capable of substantially receiving a portion of the dispersed light from the dispersing element 1930 and substantially focusing the dispersed light onto a detecting element 1970.

Figure 11C:
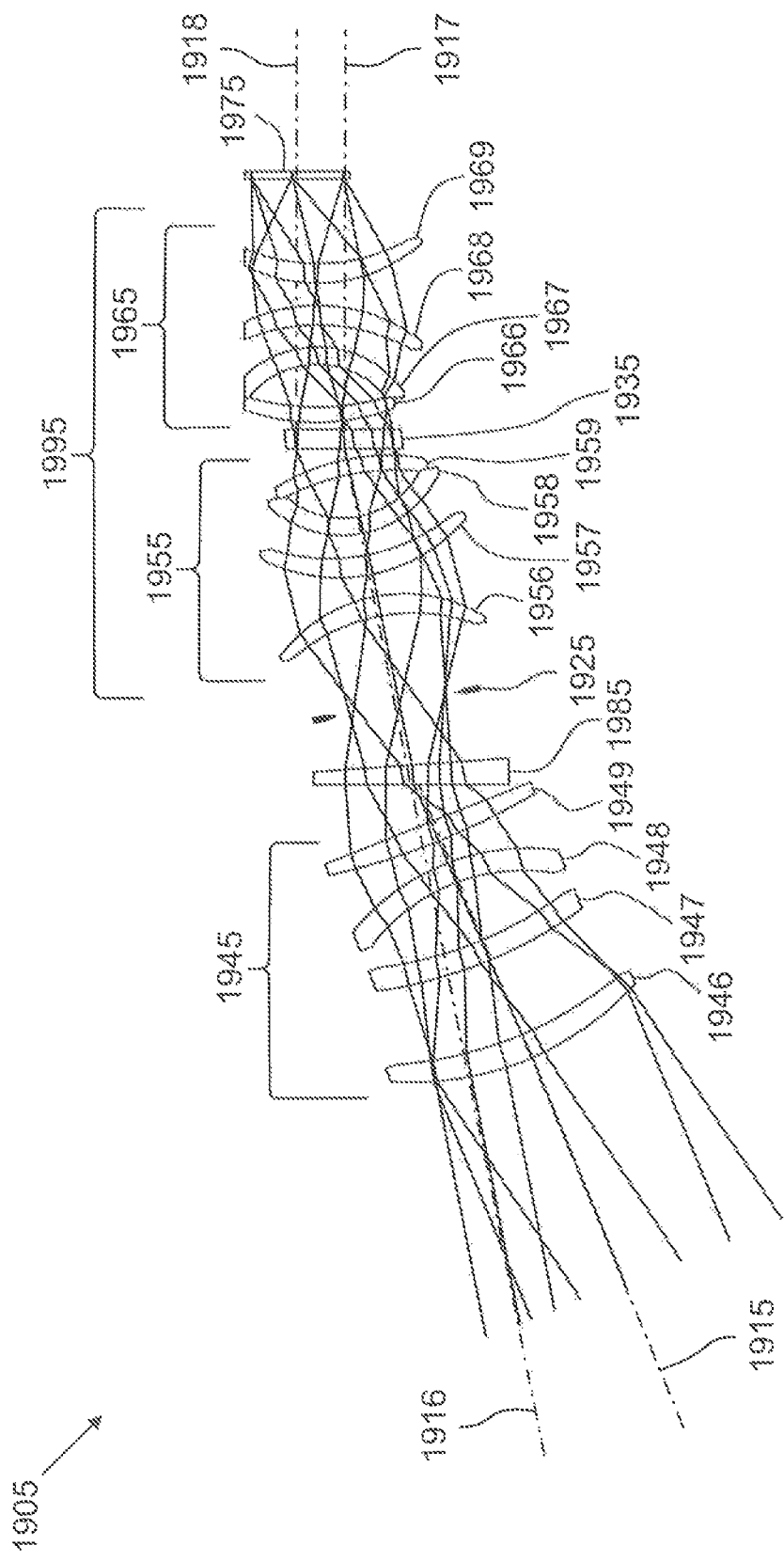
FIG. 11C is a schematic view of still another embodiment of the present teachings, taken along its optical axis in the plane perpendicular to the direction of dispersion.

Reference is made to FIG. 11C, which is a schematic view of still another embodiment of the present teachings 1905 taken along the plane containing its optical axis 1915, and in the plane perpendicular to the direction of dispersion. In operation, light, emitted or reflected by a portion of the source (not shown), is incident onto an optical system 1945, in this embodiment made up of, but not limited to, four refractive elements 1946, 1947, 1948, and 1949, which is capable of substantially receiving a portion of the light from the source and focusing the light. The light is then incident onto an axis bending element 1985, which is capable of substantially bending the optical axis 1915 onto the optical axis 1916. In this embodiment, the axis bending element 1985 is further capable of receiving a portion of the light from the optical system 1945 and substantially redirecting the focusing light onto a field aperture 1925, which is capable of substantially receiving the light from the axis bending element 1985. Light transmitted by the field aperture 1925 is then incident onto a first half 1955 of an optical relay spectrometer system 1995, in this embodiment made up of, but not limited to, four refractive elements 1956, 1957, 1958, and 1959, which is capable of substantially receiving a portion of the light from the field aperture 1925. The light is then incident onto a dispersing element 1935, which is capable of substantially receiving the light from the first half 1955 of the optical relay spectrometer system 1995 and substantially dispersing the light. The dispersed light is then incident onto a second half 1965 of the optical relay spectrometer system 1995, in this embodiment made up of, but not limited to, four refractive elements 1966, 1967, 1968, and 1969, where the optical axis 1917 of the second half 1965 of the optical relay spectrometer system 1995 is substantially offset from the optical axis 1916. The second half 1965 on the optical relay spectrometer system 1995 is capable of substantially receiving a portion of the dispersed light from the dispersing element 1935 and substantially focusing the dispersed light onto a detecting element 1975.

Figure 11D:
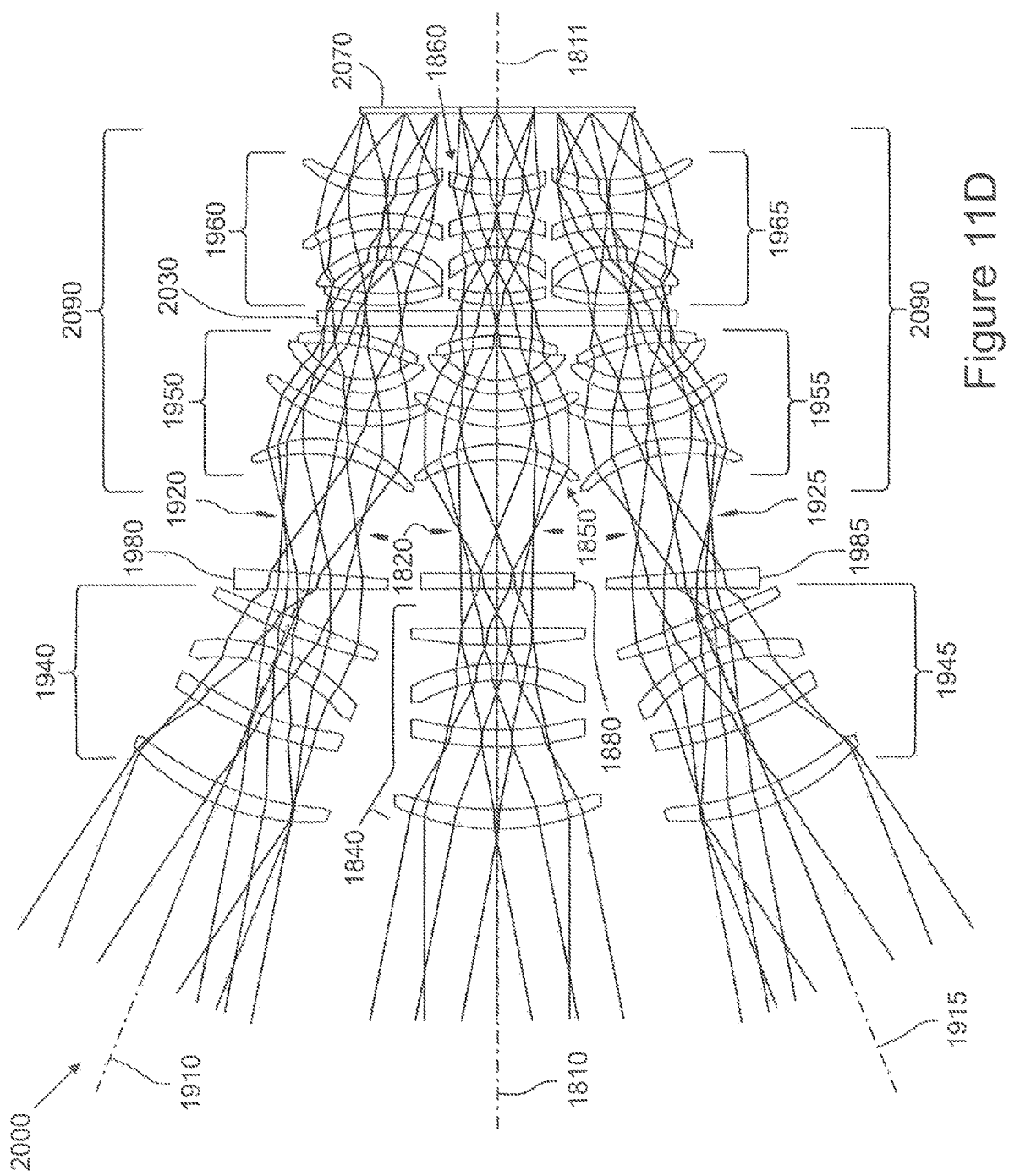
FIG. 11D is a schematic view of an embodiment of the present teachings, consisting of portions of the embodiments illustrated in FIGS. 11A, 11B, and 11C, taken along the plane perpendicular to the direction of dispersion.

Reference is made to FIG. 11D, which is a schematic view of an embodiment of the present teachings 2000 taken along the plane containing its optical axes 1810, 1910, and 1915, and in the plane perpendicular to the direction of dispersion. In operation, light, emitted or reflected by a first portion of the source (not shown), is incident onto a first optical system 1840, which is capable of substantially receiving a portion of the light from the first portion of the source and focusing the light. The light is then incident onto an optional window 1880, which is included in the optical path in some embodiments. The optional window 1880 is capable of substantially receiving a portion of the light from the first optical system 1840 and substantially transmitting the focusing light onto a first field aperture 1820, which is capable of substantially receiving the light from the optical system 1840. Light transmitted by the first field aperture 1820 is then incident onto a first portion 1850 of an optical relay spectrometer system 2090, which is capable of substantially receiving a portion of the light from the first field aperture 1820. The light is then incident onto a first portion of a dispersing element 2030, which is capable of substantially receiving the light from the first portion 1850 of the optical relay spectrometer system 2090 and substantially dispersing the light in a first direction. The dispersed light is then incident onto a second portion 1860 of the optical relay spectrometer system 2090, which is capable of substantially receiving a portion of the dispersed light from the first portion of the dispersing element 2030 and substantially focusing the dispersed light onto a first portion of a detecting element 2070. Light, emitted or reflected by a second portion of the source (not shown), is incident onto a second optical system 1940, which is capable of substantially receiving a portion of the light from second portion of the source and focusing the light. The light is then incident onto a first axis bending element 1980, which is capable of substantially bending the optical axis 1910 onto the optical axis 1911. In this embodiment, the axis bending element 1980 is further capable of substantially receiving a portion of the light from the second optical system 1940 and substantially redirecting the focusing light onto a second field aperture 1920, which is capable of substantially receiving the light from the first axis bending element 1980. Light transmitted by the second field aperture 1920 is then incident onto a third portion 1950 of the optical relay spectrometer system 2090, which is capable of substantially receiving a portion of the light from the second field aperture 1920. The light is then incident onto a second portion of a dispersing element 2030, which is capable of substantially receiving the light from third portion 1950 of the optical relay spectrometer system 2090 and substantially dispersing the light substantially in the same first direction and redirecting the light in a second direction. The dispersed and redirected light is then incident onto a fourth portion 1960 of the optical relay spectrometer system 2090, which is capable of substantially receiving a portion of the dispersed and redirected light from the second portion of the dispersing element 2030 and substantially focusing the dispersed and redirected light onto a second portion of the detecting element 2070. Light, emitted or reflected by a third portion of the source (not shown), is incident onto a third optical system 1945, which is capable of substantially receiving a portion of the light from third portion of the source and focusing the light. The light is then incident onto a second axis bending element 1985, which is capable of substantially bending the optical axis 1915 onto the optical axis 1916. In this embodiment, the axis bending element 1985 is further capable of substantially receiving a portion of the light from the third optical system 1945 and substantially redirecting the focusing light onto a third field aperture 1925, which is capable of substantially receiving the light from the second axis bending element 1985. Light transmitted by the third field aperture 1925 is then incident onto a fifth portion 1955 of the optical relay spectrometer system 2090, which is capable of substantially receiving a portion of the light from the third field aperture 1925. The light is then incident onto a third portion of the dispersing element 2030, which is capable of substantially receiving the light from fifth portion 1955 of the optical relay spectrometer system 2090 and substantially dispersing the light substantially in the same first direction and redirecting the light in a third direction. The dispersed and redirected light is then incident onto a sixth portion 1965 of the optical relay spectrometer system 2090, which is capable of substantially receiving a portion of the dispersed and redirected light from the third portion of the dispersing element 2030 and substantially focusing the dispersed and redirected light onto a third portion of the detecting element 2070.

It should be noted that the various portions of the source may overlap or may not overlap. It should also be noted that any of the optical elements or axis bending elements can be incorporated into a single component as portions of that component, and can be fabricated by any means of single component manufacturing, such as but not limited to molding, diamond turning, etc., bonding or tiling of elements, etc. to create a single component with combined features.

For the purposes of describing and defining the present teachings, it is noted that the term "substantially" is utilized herein to represent the inherent degree of uncertainty that may be attributed to any quantitative comparison, value, measurement, or other representation. In respect to optical operations, such as redirecting light or overlapping of optical fields, the inherent degree of uncertainty is the degree of uncertainty known to one skilled in the art. The term "substantially" is also utilized herein to represent the degree by which a quantitative representation may vary from a stated reference without resulting in a change in the basic function of the subject matter at issue.

Although these teachings have been described with respect to various embodiments, it should be realized these teachings are also capable of a wide variety of further and other embodiments within the spirit and scope of these teachings. For example, although the axis bending element shown located in a number of positions in the embodiments shown, it should be noted that the specific location of the axis bending element is not limited to these locations, but can in general be located anywhere, and in multiple locations, within the embodiment. Furthermore, any number of optical elements, reflective or refractive, can be used in the embodiments of the present teachings, and any aspects of the embodiments of the present teachings, including but not limited to those shown, can be used in combination with one another as still further embodiments, such that each portion of the object can be imaged by any method such as but not limited to those shown in the embodiments of the present teachings. For example, an embodiment consisting of an axis bending element can be used to image a first portion of the object while an embodiment consisting of a shifted axis, or other method, can be used to image a second portion of the object. Still further, although the embodiments of the optical systems of the present teachings have been shown arranged in a linear array of two and three systems, it should be realized that these teachings can include any number and combination of systems arranged in one-dimensional, two-dimensional, hexagonal, annular, or other arrangements.

What is claimed is:

1. An optical imaging system comprising:
    a first optical subassembly having at least one optical element; said first optical subassembly being optically disposed to receive light from a first portion of a source;
    a first field aperture; said first field aperture bin optically disposed to substantially receive a portion of said light from said first optical subassembly;
    a second optical subassembly having at least one optical element; said second optical subassembly being optically disposed to substantially receive a portion of said light from said first field aperture;
    said second optical subassembly having a first optical axis;
    a first dispersing and redirecting component; said first dispersing and redirecting component comprising a first dispersing element and a first axis bending element;
    said first dispersing element being optically disposed to substantially receive a portion of said light from said second optical subassembly;
    said first dispersing element being configured to substantially disperse said light substantially in a first direction according to its wavelength;
    said first axis bending element being optically disposed to substantially receive dispersed light from said first dispersing element;
    said first axis bending element being configured to substantially redirect said dispersed light substantially in a second direction;
    a third optical subassembly having at least one optical element; said third optical subassembly being optically disposed to substantially receive a portion of said dispersed light from said first axis bending element;
    said third optical subassembly having a second optical axis;
    said second optical axis being substantially non-parallel to said first optical axis;
    said first optical axis and said second optical axis comprising a first optical plane;
    said second direction being in the first optical plane;
    an image plane;
    said third optical subassembly being configured to substantially image a portion of said dispersed light from said first axis bending element onto a first portion of said image plane;
    said first field aperture, said second optical subassembly, said first dispersing and redirecting component, and said third optical subassembly comprising a first imaging spectrometer system; said first imaging spectrometer system being configured to disperse light according to its wavelength in a direction substantially orthogonal to said first optical plane;
    a fourth optical subassembly having at least one optical element; said fourth optical subassembly being optically disposed to receive light from a second portion of a source;
    a second field aperture; said second field aperture being optically disposed to substantially receive light from said fourth optical subassembly;
    a fifth optical subassembly having at least one optical element; said fifth optical subassembly being optically disposed to substantially receive a portion of said light from said second field aperture;
    said fifth optical subassembly having a third optical axis;
    a second dispersing and redirecting component; said second dispersing and redirecting component comprising a second dispersing element and a second axis bending element;
    said second dispersing element being optically disposed to substantially receive a portion of said light from said fifth optical subassembly;
    said second dispersing element being configured to substantially disperse said portion of said light, substantially in a third direction according to its wavelength;
    said second axis bending element being optically disposed to substantially receive said dispersed light from said second dispersing element;
    said second axis bending element being configured to substantially redirect said dispersed light in a fourth direction;
    a sixth optical subassembly having at least one optical element; said sixth optical subassembly being optically disposed to substantially receive a portion of said dispersed light from said second axis bending element;
    said sixth optical subassembly having a fourth optical axis;
    said fourth optical axis being substantially non-parallel to said third optical axis;
    said third optical axis and said fourth optical axis comprising a second optical plane;
    said fourth direction being in the second optical plane;
    said sixth optical subassembly being configured to substantially image a portion of said dispersed light from said second axis bending element onto a second portion of said image plane;
    said second field aperture, said fifth optical subassembly, said second dispersing and redirecting component, and said sixth optical subassembly comprising a second imaging spectrometer system; said second imaging spectrometer system being configured to disperse light according to its wavelength in a direction substantially orthogonal to said second optical plane.

2. The optical imaging system of claim 1 wherein said at least one optical element in one of said first, second, third, fourth, fifth and sixth optical subassemblies is refractive.

3. The optical imaging system of claim 1 wherein at least one of said first axis bending element and said second axis bending element comprises a prism.

4. The optical imaging system of claim 1 wherein said first axis bending element and said second axis bending element are portions of the same component.

5. The optical imaging system of claim 1 wherein said first portion of the source and said second portion of the source substantially overlap with one another.

6. The optical imaging system of claim 1 wherein said first portion of the source and said second portion of the source do not substantially overlap with one another.

7. The optical imaging system of claim 1 wherein at least one of said first axis bending element and said second axis bending element is a grism.

8. The optical imaging system of claim 1 wherein the at least one optical element of the second optical subassembly and the at least one optical element of the fifth optical subassembly are portions of a same component.

9. The optical imaging system of claim 1 wherein the at least one optical element of the third optical subassembly and the at least one optical element of the sixth optical subassembly are portions of a same component.

10. The optical imaging system of claim 1 wherein said second direction and said fourth direction are substantially parallel.

11. The optical imaging system of claim 1 wherein at least one of said first dispersing and redirecting component and said second dispersing and redirecting component comprises a grism.

12. The optical imaging system of claim 1 wherein said first dispersing element and said first axis bending element are portions of a compound angle grism.

13. An optical imaging system comprising:
- a first optical subassembly having at least one optical element; said first optical subassembly being optically disposed to receive light from a first portion of a source;
- a first field aperture; said first field aperture being optically disposed to substantially receive a portion of said light from said first optical subassembly;
- a second optical subassembly having at least one optical element; said second optical subassembly being optically disposed to substantially receive a portion of said light from said first field aperture;
- said second optical subassembly having a first optical axis;
- a first dispersing and redirecting component; said first dispersing and redirecting component comprising a first dispersing element and a first axis bending element;
- said first axis bending element being optically disposed to substantially receive a portion of said light from said second optical subassembly;
- said first axis bending element being configured to substantially redirect said light substantially in a first direction;
- said first dispersing element being optically disposed to substantially receive said light from said first axis bending element;
- said first dispersing element being configured to substantially disperse said light substantially in a second direction according to its wavelength;
- said second direction being substantially orthogonal to said first direction;
- a third optical subassembly having at least one optical element; said third optical subassembly being optically disposed to substantially receive a portion of said dispersed light from said first dispersing element;
- said third optical subassembly having a second optical axis;
- said second optical axis being substantially non-parallel to said first optical axis;
- said first optical axis and said second optical axis comprising a first optical plane;
- an image plane;
- said first direction being in the first optical plane;
- said third optical subassembly being configured to substantially image a portion of dispersed light from said first dispersing element onto a first portion of said image plane;
- said first field aperture, said second optical subassembly, said first axis bending element, said first dispersing element, and said third optical subassembly comprising a first imaging spectrometer system; said first imaging spectrometer system being configured to disperse light according to its wavelength in a direction substantially orthogonal to said first optical plane;
- a fourth optical subassembly having at least one optical element; said fourth optical subassembly being optically disposed to receive light from a second portion of a source;
- a second field aperture; said second field aperture being optically disposed to substantially receive a portion of said light from said fourth optical subassembly;
- a fifth optical subassembly having at least one optical element; said fifth optical subassembly being optically disposed to substantially receive a portion of said light from said second field aperture;
- said fifth optical subassembly having a third optical axis;
- a second dispersing and redirecting component; said second dispersing and redirecting component comprising a second dispersing element and a second axis bending element;
- said second axis bending element being optically disposed to substantially receive a portion of said light from said fifth optical subassembly;
- said second axis bending element being configured to substantially redirect said light substantially in a third direction;
- said second dispersing element being optically disposed to substantially receive said light from said second axis bending element;
- said second dispersing element being configured to substantially disperse said light substantially in a fourth direction according to its wavelength;
- a sixth optical subassembly having at least one optical element; said sixth optical subassembly being optically disposed to substantially receive a portion of said dispersed light from said second dispersing element;
- said sixth optical subassembly having a fourth optical axis;
- said fourth optical axis being substantially non-parallel to said third optical axis;
- said third optical axis and said fourth optical axis comprising a second optical plane;
- said third direction being in the second optical plane;
- said sixth optical subassembly being configured to substantially image a portion of said dispersed light from said second dispersing element onto a second portion of said image plane;
- said second field aperture, said fifth optical subassembly, said second axis bending element, said second dispersing element, and said sixth optical subassembly comprising a second imaging spectrometer system; said second imaging spectrometer system being configured to disperse light according to its wavelength in a direction substantially orthogonal to said second optical plane.

14. The optical imaging system of claim 13 wherein said at least one optical element in one of said first, second, third, fourth, fifth and sixth optical subassemblies is refractive.

15. The optical imaging system of claim 13 wherein at least one of said first axis bending element and said second axis bending element comprises a prism.

16. The optical imaging system of claim 13 wherein said first axis bending element and said second axis bending element are portions of a same component.

17. The optical imaging system of claim 13 wherein said first portion of the source and said second portion of the source substantially overlap with one another.

18. The optical imaging system of claim 13 wherein said first portion of the source and said second portion of the source do not substantially overlap with one another.

* * * * *